US008364293B2

(12) United States Patent
Doherty et al.

(10) Patent No.: US 8,364,293 B2
(45) Date of Patent: Jan. 29, 2013

(54) SITUATION-NEUTRAL GOLF METRICS SYSTEMS AND METHODS

(75) Inventors: Matthew P. Doherty, North Palm Beach, FL (US); James F. Doherty, III, Raleigh, NC (US); William G. Moore, Raleigh, NC (US)

(73) Assignee: SkyHawke Technologies, LLC, Ridgeland, MS (US)

(*) Notice: Subject to any disclaimer, the term of this patent is extended or adjusted under 35 U.S.C. 154(b) by 1047 days.

(21) Appl. No.: 12/012,867

(22) Filed: Feb. 6, 2008

(65) Prior Publication Data

US 2008/0201106 A1 Aug. 21, 2008

Related U.S. Application Data

(60) Provisional application No. 60/899,915, filed on Feb. 7, 2007.

(51) Int. Cl.
*G06F 19/00* (2011.01)

(52) U.S. Cl. ............................ 700/91; 700/92; 473/131

(58) Field of Classification Search .................... 700/91; 473/131, 407

See application file for complete search history.

(56) References Cited

U.S. PATENT DOCUMENTS 5,364,093 A 11/1994 Huston et al.
5,434,789 A 7/1995 Fraker et al.
5,438,518 A 8/1995 Bianco et al.
5,469,175 A 11/1995 Boman
5,524,081 A 6/1996 Paul
5,685,786 A 11/1997 Dudley
5,689,431 A 11/1997 Rudow et al.
5,810,680 A 9/1998 Lobb et al.
5,842,147 A 11/1998 Nimura et al.
5,882,269 A 3/1999 Lewis
6,029,121 A 2/2000 Stashko
6,122,559 A * 9/2000 Bohn .............................. 700/91
6,263,279 B1 7/2001 Bianco et al.
6,278,402 B1 8/2001 Pippin
6,304,211 B1 10/2001 Boman
6,456,938 B1 9/2002 Barnard
6,496,141 B2 12/2002 Pippin
6,582,328 B2 6/2003 Kuta et al.
6,705,942 B1 3/2004 Crook et al.
6,908,404 B1 6/2005 Gard
6,998,965 B1 2/2006 Luciano, Jr. et al.
7,010,550 B2 3/2006 Tarlie
7,014,576 B1 3/2006 Posey
7,118,498 B2 10/2006 Meadows et al.
7,121,962 B2 10/2006 Reeves
2002/0019276 A1 2/2002 Kuta et al.
2002/0019677 A1 2/2002 Lee
2002/0027524 A1 3/2002 Pippin
2002/0049507 A1 * 4/2002 Hameen-Anttila ............. 700/92
2002/0052750 A1 5/2002 Hirooka
2002/0060642 A1 5/2002 Togasaka
2002/0072815 A1 6/2002 McDonough et al.
2002/0082122 A1 * 6/2002 Pippin et al. .................. 473/407
2002/0082775 A1 6/2002 Meadows et al.
2002/0188359 A1 12/2002 Morese (Continued)

*Primary Examiner* — Pierre Eddy Elisca
*Assistant Examiner* — Shahid Kamal
(74) *Attorney, Agent, or Firm* — Triangle Patents, PLLC

(57) ABSTRACT

Systems and methods providing statistical analytics of golf performance including text, tabular, graphic, and image-based outputs that include trends information for the golfer, all based upon actual golf play on course situations, wherein the golfer inputs shot data during play, without interrupting the flow of the game, and uploads the shot data for analytics and review online, including detailed diagrammatic representations of golf performance analytics, including scattergraph diagrams having the directionality of any shot being uniformly and consistently oriented to provide a zeroed-out orientation for each shot.

22 Claims, 31 Drawing Sheets

U.S. PATENT DOCUMENTS

| | | | | |
|---|---|---|---|---|
| 2003/0103001 | A1 | 6/2003 | Huston et al. | |
| 2003/0163210 | A1 | 8/2003 | Adams | |
| 2003/0191547 | A1 | 10/2003 | Morse | |
| 2004/0073325 | A1 | 4/2004 | Reeves | |
| 2004/0147329 | A1* | 7/2004 | Meadows et al. | 473/131 |
| 2005/0030223 | A1 | 2/2005 | Nazawa | |
| 2005/0182793 | A1* | 8/2005 | Keenan et al. | 707/104.1 |
| 2006/0030433 | A1 | 2/2006 | Horsley | |
| 2006/0212221 | A1 | 9/2006 | Liu | |
| 2007/0021226 | A1 | 1/2007 | Tyroler | |
| 2008/0102809 | A1* | 5/2008 | Beyer | 455/420 |
| 2010/0042320 | A1* | 2/2010 | Salmre et al. | 701/208 |
| 2011/0093123 | A1* | 4/2011 | Alexanian | 700/284 |

* cited by examiner

SITUATION-NEUTRAL GOLF METRICS SYSTEMS AND METHODS

CROSS-REFERENCE TO RELATED INVENTIONS

The present invention is based upon and claims priority from U.S. provisional patent application Ser. No. 60/899,915 filed Feb. 7, 2007, which is incorporated herein by reference in its entirety.

BACKGROUND OF THE INVENTION

1. Field of the Invention

The present invention relates generally to golf performance analytics, and more particularly to methods and systems for generating diagrammatic representations of golf performance analytics, such as scattergraph diagrams, wherein shot directionality is zeroed to a consistent direction regardless of actual orientation of shot direction in play.

2. Description of the Prior Art

Prior art diagrammatic views of golf performance is known, specifically directional and distance charts or information are known to be generated based upon a golfer's performance on a specific course of play. Also, generally, golf performance statistical programs are known, in particular for using GPS coordinates for tracking shot distances. However, detailed analytics that are specific to player status, course conditions, and other factors have not been included in tracking golf performance for players, in particular with interactivity and analytics provided based upon actual golf play under normal conditions, i.e., on a course, rather than through simulation or practice situations only. Thus there remains a need for systems and methods that provide for improved statistical analytics of golf performance and that include text, tabular, graphic, and image-based outputs that include trends information for the golfer (or multiple golfers for individual and/or collective comparison), all based upon actual golf play on course situations, wherein the golfer inputs shot data during play, without interrupting the flow of the game, and uploads the shot data for analytics and review online of golf performance.

SUMMARY OF THE INVENTION

Aspects of the present invention are to provide methods and systems for generating diagrammatic representations of golf performance analytics, such as scattergraph diagrams, to assist the user/golfer with identification and understanding of errors and trends so that adjustments to form, strategy, and ultimately performance can be made by the user.

Thus, the present invention provides detailed diagrammatic representations of golf performance analytics, such as scattergraph diagrams that provide information including zone-based target areas rather than merely pinpoint targets.

More particularly, the scattergraph diagrams of the present invention provide for the directionality of any shot to be uniformly and consistently oriented to provide a zeroed-out orientation for each shot, thereby assisting the user/golfer with identification and understanding of errors and trends related to shot misdirection and the corresponding causes related thereto, so that adjustments to form, strategy, and ultimately performance can be made by the user.

One aspect of the present invention is to provide a system for statistical analysis for golf performance of a user wherein the user provides inputs and coordinates of a series of corresponding starting points and target areas as well as recordation of actual shot locations from those starting points, and wherein the statistical analysis includes text, tabular, diagrammatic, and/or image-based outputs, in particular scattergraph diagrams that provide for the directionality of any shot to be uniformly and consistently oriented to provide a zeroed-out orientation for each shot, and for providing information relating to trends in golf performance, in particular to shot misdirection and the corresponding causes related thereto, over a predetermined period.

In a preferred embodiment, the system includes a portable unit operable for communication with a remote server computer, wherein the user inputs to the unit information and GPS data relating to the shots and the unit communicates that information to the server computer for analysis to be performed by software operating thereon, with outputs being provided via a graphic user interface including scattergraph diagrams that provide for the directionality of any shot to be uniformly and consistently oriented to provide a zeroed-out orientation for each shot, thereby assisting the user/golfer with identification and understanding of errors and trends related to shot misdirection and the corresponding causes related thereto, so that adjustments to form, strategy, and ultimately performance can be made by the user. The system further provides for a unique login for each user to access the remote server computer via the Internet for uploading his/her data from the input device, and for modifying and adding information after play, including secondary information that includes more detail about play conditions, user status, etc.

Another aspect of the present invention is to provide methods for statistical analysis of golf performance of a user including the steps of the user inputting information and corresponding coordinates for a series of shots including a start point and a target area, as well as actual shot location throughout a course of play; the user uploading that information and data to a remote server computer, where software is operable to perform statistical analysis and provide outputs including scattergraph diagrams, to the user relating to trends in the user's performance over a predetermined period; wherein the scattergraph diagrams include information relating to the directionality of any shot to be uniformly and consistently oriented to provide a zeroed-out orientation for each shot, thereby assisting the user/golfer with identification and understanding of errors and trends related to shot misdirection and the corresponding causes related thereto, so that adjustments to form, strategy, and ultimately performance can be made by the user.

Thus, the present invention provides automatic analytics for user-provided inputs of golf performance over a period of time. Advantageously, compared with prior art, the present invention provides a significant level of detail and customization by the user so that the feedback or statistical output on golf performance and trends provides normalized information that is actionable by the user to correct or improve his/her game.

These and other aspects of the present invention will become apparent to those skilled in the art after a reading of the following description of the preferred embodiment when considered with the drawings, as they support the claimed invention.

DETAILED DESCRIPTION

Figure 1:
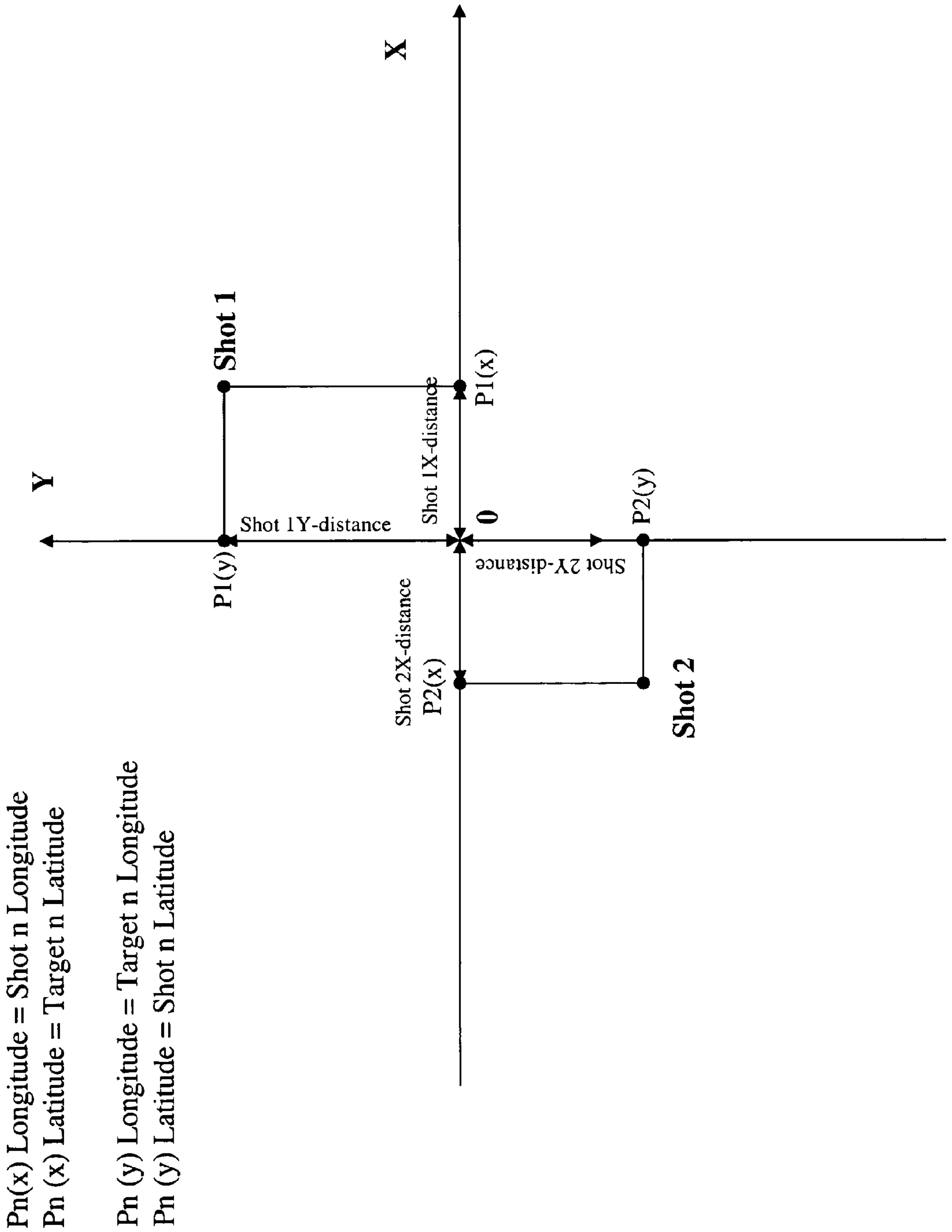
FIGS. 1-11 are schematic drawings illustrating diagrammatic representation of golf performance analytics in accordance with an embodiment of the present invention.

In the following description, like reference characters designate like or corresponding parts throughout the several views. Also in the following description, it is to be understood that such terms as “forward,” “rearward,” “front,” “back,” “right,” “left,” “upwardly,” “downwardly,” and the like are words of convenience and are not to be construed as limiting terms.

Referring to the drawings in general, the illustrations are provided for the purpose of describing a preferred embodiment of the invention and are not intended to limit the invention thereto. The present invention provides diagrammatic visualization of a target zone or area versus pinpoint target for a user providing inputs to a portable GPS-enabled device or unit, preferably the inputs being made during the course of play on a golf course having a defined initial start point and final pinpoint target as well as intermediate targets and corresponding intermediate start points. The systems and methods of the present invention further provide for user access to statistical analytics and graphical user interfaces provided by software running on a remote server computer in communication with the user’s computer via a network, preferably the web (WWW). The GPS target identification according to the system and method of the present invention provides the user to enter a target area as a zone or location. The zone is preferably regional, such as an undefined area that is located at an approximate range of distances from the initial point or starting point entered by the user, based upon the golf ball location at the start of play on any given shot. The range of distances from the initial point is preferably between about less than one foot and about 350 yards. the location of this zone or range of distances varies depending upon the entry by the user, i.e., to simulate golf course or golf hole play, the location of the zone or range of distances is preferably but not always in the general direction of a final target, which is a pin point, more particularly a pin point associated with the golf hole. However, in between the initial start point and the final target are likely to be at least one intermediate target; the location of the target is between the initial start point and the final target or hole, but the intermediate target is a range of distances defining an area or a target zone rather than a pinpoint because there is not a specific location that is narrowly defined as the intermediate target.

The present invention provides detailed diagrammatic representations of golf performance analytics, such as scattergraph diagrams, that provide information including zone-based target areas rather than merely pinpoint targets, and wherein the directionality of each shot is zeroed to facilitate identification of direction-based errors. Therefore, the present invention provides for situation-neutral golf metrics that are useful regardless of whether the application user is playing on a course or in a practice setting.

More particularly, the present invention provides for situational golf shot data and analytics. Significantly, the golf shot data and analytics of the systems and methods of the present invention are provided in a relative mode, i.e., each shot is directional compared to a starting point and a target area, wherein that direction is zeroed out to a (0,0) coordinate starting point and the direction is consistently oriented for each shot such that when all shots are considered collectively, regardless of actual GPS direction or positioning, trends information is quickly identifiable because all shots are aligned in the same direction for the purposes of the analytics on the remote server computer. Thus, while the actual shots may be taken during play on a golf course, the situation-neutral based system eliminates the actual GPS directionality of any shot from start point to target area and uses a zeroed directionality instead to facilitate comparison of shots and their deviation from target direction.

The systems and methods of the present invention are thus particularly useful in a practice mode. Since the directionality is zeroed by the software running on the server computer, the inputs from the application user and GPS data provide accuracy of the actual shot versus target area comparisons, but the data is also useful for practice apart from the context of a course. The situational shot data, or situation-neutral shot data, is based upon the initial start point and first target zone; the second start point and second target zone, etc., until the final shot from final start point to final target (and final actual shot) are completed, wherein each respective start point and target area or zone are considered out of context of a course of play or golf course location. Unique to the present invention compared to prior art, each shot start is zeroed out and its location established as the zero point with direction of play oriented to a consistent, predetermined direction, such as true north. Statistical analytics relating to the user’s shot data are provided including outputs having scattergraph diagrams that include information relating to the directionality of any shot to be uniformly and consistently oriented to provide a zeroed-out orientation for each shot, thereby assisting the user/golfer with identification and understanding of errors and trends related to shot misdirection and the corresponding causes related thereto, so that adjustments to form, strategy, and ultimately performance can be made by the user.

Referring now to the drawings in general, the illustrations are for the purpose of describing a preferred embodiment of the invention and are not intended to limit the invention thereto. As best seen in FIGS. 1-11, schematic representations of the methods and graphics used for providing visualization for golf performance analytics are shown. FIGS. 12-31 are screenshot images of user interfaces for entering information and viewing analytical outputs according to the present invention.

The present invention provides a system for providing statistical analysis for golf performance of a user including a portable input device, preferably a handheld device with GPS-functionality, operable for capturing shot data during the golf play of a golfer, the device being further operable to transmit the shot data and related GPS data to a computer for reviewing the shot data and analysis of the shot data through a graphical user interface viewable on a display; the computer further including software operable for providing statistical analysis of the shot data; wherein the user provides inputs and coordinates of a series of corresponding starting points and target areas, and recordation of actual shot locations from those starting points during the golf play via the device; and wherein the statistical analysis includes outputs relating to the golfer’s golf performance over a predetermined period; and wherein the outputs include scattergraph diagrams having information relating to the directionality of any shot to be uniformly and consistently oriented to provide a zeroed-out orientation for each shot, thereby assisting the user/golfer with identification and understanding of errors and trends related to shot misdirection and the corresponding causes related thereto, so that adjustments to form, strategy, and ultimately performance can be made by the user.

Preferably, the statistical analysis of the shot data viewable via a graphic user interface on a display includes outputs selected from text, tabular, diagrammatic, image-based outputs, and combinations thereof; also, the statistical analysis includes trends in the golfer's golf performance over a predetermined period.

Also preferably, the computer is a remote server computer (RSC) and the shot data is uploaded from the device to the RSC through a communications network, such as the device uploading information through a computer (or directly, depending upon the device) that transmits the data for analysis and storage on the remoter computer so that the user can access the data and review it at any time from nearly any place via the Internet or worldwide web network. The user may be provided a unique user identification associated with each golfer that is usable by the golfer to access a remote server computer for uploading his data, and for modifying and adding information, including secondary information, such as golf course conditions, weather, golfer status, equipment specifics, shot corrections, penalty shot positions, and combinations thereof.

In any case, it is preferred that the unit be operable to receive from the golfer shot data inputs including GPS data relating to golf shots, and wherein the unit is operable to transfer the shot input data to the computer for analysis to be performed by software operating thereon.

The present invention also provides a method for providing statistical analysis of golf performance of a golfer including the steps of the golfer inputting shot data including corresponding coordinates for a series of shots including a start point and a target area, as well as actual shot location throughout a course of play using a GPS-enabled input device; the user uploading the shot data to a remote server computer; software operable on the computer performs statistical analysis of the shot data associated with the golfer; and the software providing analytics outputs to the user via a display having a graphical user interface, including trends in the golfer's performance over a predetermined period.

Additionally, the golfer has review options provided on a graphical user interface on a display for reviewing, editing, modifying, and adding data to the uploaded shot data. In another embodiment, a method for providing statistical analytics of golf performance includes the steps of providing a GPS-operable device operable for a user to input golf shot data during play on a course; uploading the golf shot data including GPS data to a computer having software for providing analysis of the data; and providing outputs including analytics of the data, wherein the outputs are viewable by the user via a graphic user interface on a display, text, tabular, graphic, and image-based outputs that include trends information for the golfer, all based upon actual golf play on course situations, wherein the golfer inputs shot data during play, without interrupting the flow of the game, and uploads the shot data for analytics and review online. Again, the analytics preferably includes text, tabular, graphic, and image-based outputs that include trends information based upon the shot data input by the user, wherein the shot data is based upon actual golf play on course situations, and the golfer inputs shot data during play.

The present invention provides systems and methods for providing statistical analysis and corresponding outputs, including tabular and/or diagrammatic representation of golf performance by a user. The systems and methods further provide for software operable on a server computer on which the statistical analysis is performed on data uploaded from a portable device or unit having global positioning satellite (GPS) functionality. Preferably the user inputs predetermined information to the device during the course of golf play; these inputs are combined with GPS data or data points that correspond to the user's ball location, including respective start point and target areas, including an initial start point and final target area for each golf shot, wherein a series ultimately ends in a final shot successfully reaching a final end point or hole.

Preferably, device-specific software is installed and operational on the device to provide a user interface for the user inputting information regarding start points and target areas coupled in a series of at least one shot (formed by the start point and actual landing of the ball with respect to the target area) and for corresponding GPS data to be captured for those shots as well as for the target areas. An upload mechanism is operational on an individual user device or unit that is operable by an application user. The unit is equipped with global positioning satellite (GPS) functionality. Preferably, the present invention methods and system are operable on such a GPS-operable unit so that the application user of the unit inputs primary and secondary information that relate to his/her coordinates. Primary information includes a first position and a target area of the application user to the unit. In one embodiment, the first position and target area relate to a golf course, and more particularly to a hole playable on a golf course on which the application user is positioned to play. The present invention systems and methods are adaptable to be used on or retrofitted to existing GPS golf play units. Graphic user interface modifications and software of the present invention are uploaded via a software as a service (SaaS) operation from a network connected to the worldwide web ("the web").

In one embodiment of the present invention the GPS coordinates are generated using an ASP.NET library for the GPS calculations, for example as with Geo Frameworks—http://www.geoframeworks.com. For calculation of distances between two GPS coordinates, they use the Position class. Two instances of Position class are initiated with longitude and latitude that they get from the handheld GPS device, those positions are the start and result coordinates. Then use the Position.DistanceTo(Position destination) method (see description by the following link) to get the distance between two points.

According to the present invention, a method of use includes an application user entering an unique user identification and secure login, such as by password, via a user interface on the GPS operable unit. Significantly, the present invention provides for user input of the first position or initial ball location with a prompt to mark your location, more particularly as the user is standing at the current ball location before hitting the ball. Then, another prompt requests the target location, such as by prompting whether the pin that marks the hole is the target. If the user enters YES, then he proceeds with the shot to hit the target. If the user enters no, then at the ball, the user marks the location of the ball and also enters a target area. Thereafter, the user hits the ball preferably toward the target area. Once the shot is completed and the ball lands in a next location or position, the user enters input for location information of the resulting shot to indicate whether the ball hit the target. If not, then the plays or shots continue until the user enters affirmatively and the hole is played out, if on a golf course. The user continues to mark the pin or next start location and a series of start-to-target entries are made until the hole is played out, including putts. After the user is finished with the round, the information entered is uploaded from the handheld GPS device to the server, where the data is stored for that user's unique identity and for the corresponding play location. Alternatively, the user-entered information and GPS location data are automatically transmitted to the server through the network. While in a preferred embodiment at the time of the invention provides for user-entered information and GPS data to be automatically transferred when the unit is connected to a network via USB and a computer for communication with the remote server, other means of transmission including wireless would be considered within the scope of the present invention.

Methods of use of the unit to communicate the user inputs and GPS data to the server include the steps of user logging onto to server under the software as a service operation of the present invention; the user information and GPS data being downloaded or uploaded to the server computer, preferably directly from unit without requiring additional software or data to be saved or otherwise stored on an intermediate computer; while the user is logged online with server computer, accessing any presently loaded or prior-loaded inputs from golf play by that same user to modify or manipulate data, including providing inputs for additional information that provide more detail on the conditions of play; the software on the server performing statistical analysis on the inputs and providing output in the form of text, tables, diagrams, images and combinations thereof. Preferably, the analytical software functions on the remote server computer to provide more dynamic updates and software upgrades; however, analytical software operating on the portable unit or on an intermediate computer to perform the functions as set forth hereinabove is considered within the scope of the present invention.

The data and analytics is stored and categorized by user and course, as well as shots, clubs, etc. Preferably this information and data is not stored on the handheld device, but rather on the remote server computer, computer, or other data storage device or medium.

Regarding visualization of data, different visualization options of the shot data and related analytics are available, including tabular and map-type views, that are selectively reviewable by the user on the device, or on a remote computer connected to the server via the network, connected to the web. Additional shot-by-shot views and statistics are optionally reviewable by the user and/or a third party with permission for such review. In addition to the primary information, the user optionally enters secondary information, including but not limited to slope of the landscape between the ball and the target area, ball position on that landscape, wind direction, wind strength, precipitation, humidity, penalty strokes, altitude, player status (such as injury, sickness, etc.) and combinations thereof.

Other options the user activates on the unit for the present invention include saving data inputs, operating a report function to generate basic feedback to the user about his/her play inputs compared to targets, clubs, conditions, and combinations thereof. Reports include average score, breakdown by par/hole, scrambling percentage, sand saves, driving accuracy, and other standard metrics and combinations thereof, as well as trends information. Additionally, information is available for review by club, by conditions or situations such as represented by the secondary inputs. A percent error index (PEI) is also available; this PEI is a calculation of how close the actual user shots were from start to target for each series within the play period, which may be the golf course, a series of holes on a golf course, a practice session, a golf school or lessons by professional instruction over a predetermined period of time.

By way of example and not limitation, one modification that the systems and methods of the present invention permit the user to make is to modify shot information, including ball location as provided by the GPS. This is particularly helpful in the case of play on a golf course wherein the user/golfer makes an error such as hitting the ball into a body of water. According to golf rules, this is considered a penalty and a drop shot is permitted over the last point where the ball crossed land; however, for the purpose of providing statistical analysis and feedback of golf performance, it is not helpful for the system or software to consider that the shot merely landed at that drop point, rather than at the actual location or area where the ball hit the water. This type of modification is relevant for penalty shot circumstances. In this case, the user modifies the shot information while accessing the software operating on the server computer. Shot modification can be manually entered, but more preferably, the user click selects or otherwise indicates a location on a map of the golf course hole that was being played. Thus, the user indicates on the map of a hole where the end point of a shot actually was for the penalty, i.e., in the water, out of bounds, or is lost.

Since for any of these occurrences, the user will not be able to mark the precise location where the ball landed, the system allows the user to click on the map of the hole to estimate the location. Preferably, each pixel or predetermined group of pixels of the map are associated with separate GPS coordinates. When the user clicks on the map, the correspondingly associated GPS coordinates of where they clicked are used as the end point for that shot instead of the penalty start location. The line of the shot will then end with an X instead of a dot to indicate that this is an estimate rather than an actual pinpoint location of the ball at the end of that shot. The next shot will then start from where the golfer took his penalty shot. If no map exists, they will be able to enter the distance and direction manually.

For scatter graph generation as shown in FIG. 1, the present invention systems and methods select shots made by a user using a specific golf club and for which flagstick is the target area (in this case, a pinpoint target). Then the coordinates of the flagstick are projected for each shot in 0 point and find the distance from 0 point to: Pn(x)—distance in X-direction, Pn(y)—distance in Y-direction.

X-Direction Distance Calculation

The distance from target to shot in X-direction is calculated as follows:

The reference point is taken as the coordinates of flagstick, to which the shot was targeted. The end point is Pn(x), which is calculated as:

$$Pn(x)\text{Longitude}=\text{Shot } n \text{ Longitude}$$

$$Pn(x)\text{Latitude}=\text{Target } n \text{ Latitude}$$

Y-Direction Distance Calculation

For calculating distance from target to shot in Y-direction the similar method is used.

The reference point is taken as the coordinates of flagstick, to which the shot was targeted. The end point is Pn(y), which is calculated as:

$$Pn(y)\text{Longitude}=\text{Target } n \text{ Longitude}$$

$$Pn(y)\text{Latitude}=\text{Shot } n \text{ Latitude}$$

Positioning Shot by X,Y Coordinates

After the coordinates of Pn(x), Pn(y) have been found, we can calculate the distances from Pn(x), Pn(y) points to the Target. And this will be the distances of n-shot in X, Y directions. The distances are calculated with the help of GeoFrameworks library. Then it's needed to find the position of Pn(x), Pn(y) point relative to 0 point. At first we should determine the hemisphere of GPS coordinates. If hemisphere is South or West then we take those coordinates with negative sign.

If Longitude of Pn(x) point is larger than Longitude of 0 point, it means that the point is located on the right (to the east).

If Latitude of Pn(y) point is larger than Latitude of 0 point, it means that the point is located higher (to the north).

For instance:

We received following GPS Coordinates:

End shot point latitude (2649.4087, N)

End shot point longitude (08006.9080, W)

Hole point latitude (2649.4087, S)

Hole point longitude (08006.9100, W)

To determine the position of the shot point relative to the hole by Y axe we should take shot point latitude with positive sign (because it's North hemisphere) and compare it with hole point latitude with negative sign (because it's South hemisphere). 2649.4087 is greater than (−2649.4087). So point is located higher (to the north). The same algorithm for determining the position by X axe. But in this case the West hemisphere is negative and the East is positive.

Updates to Support Direction of Play on Scatter Graph

Figure 2:
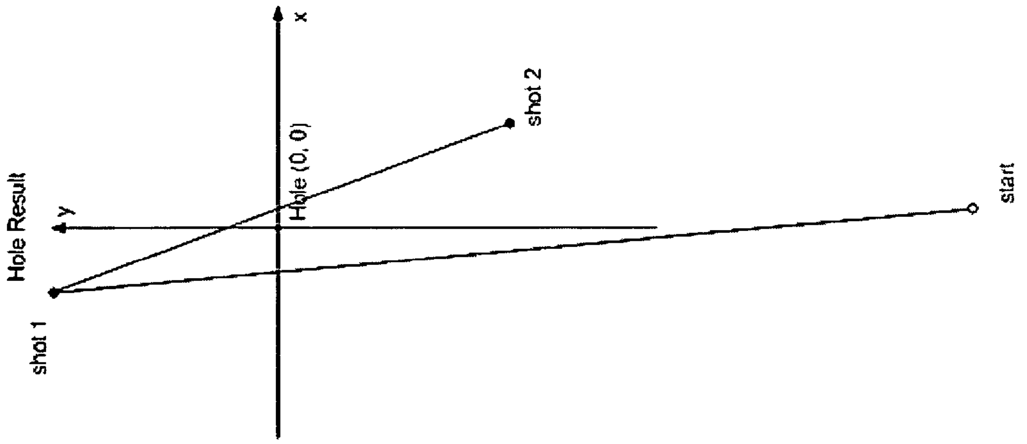
Figure 3:
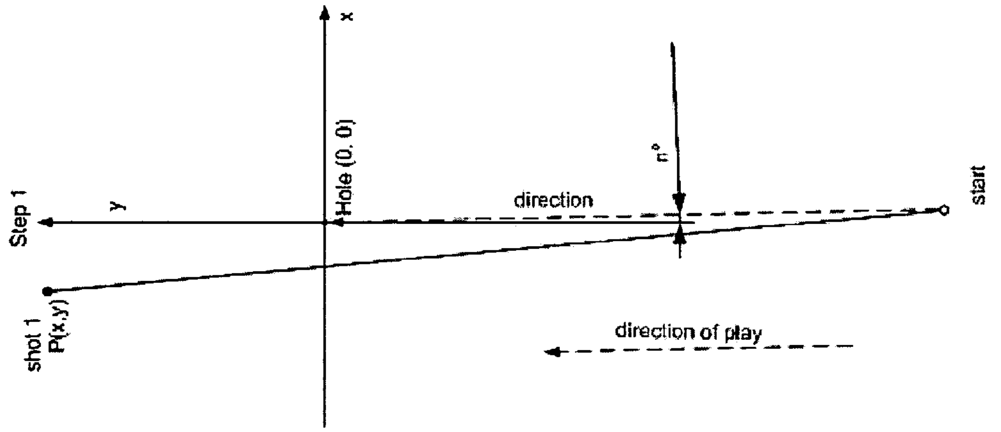
Figure 4:
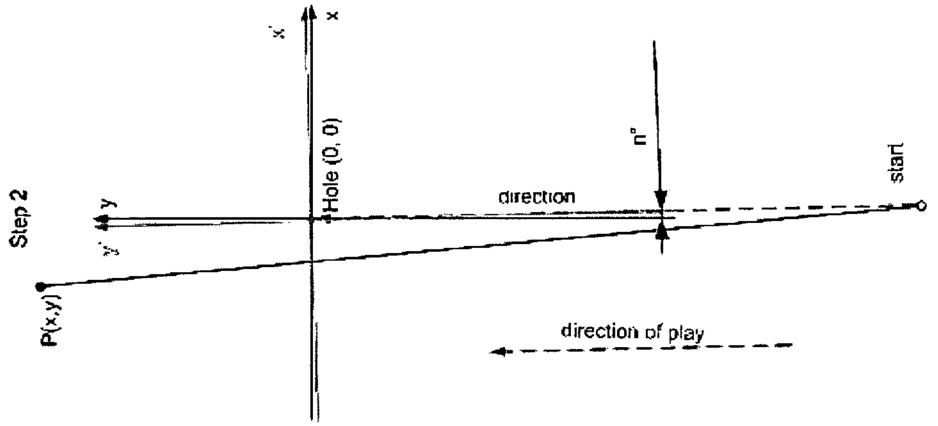
Figure 5:
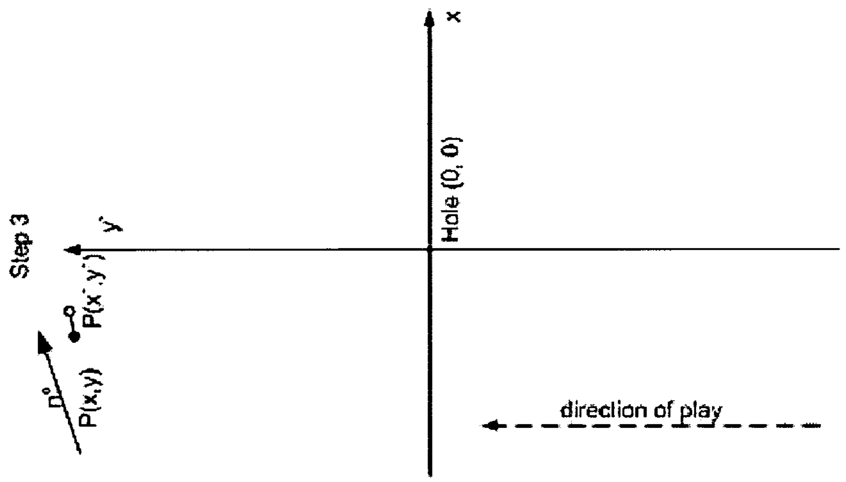
Figure 6:
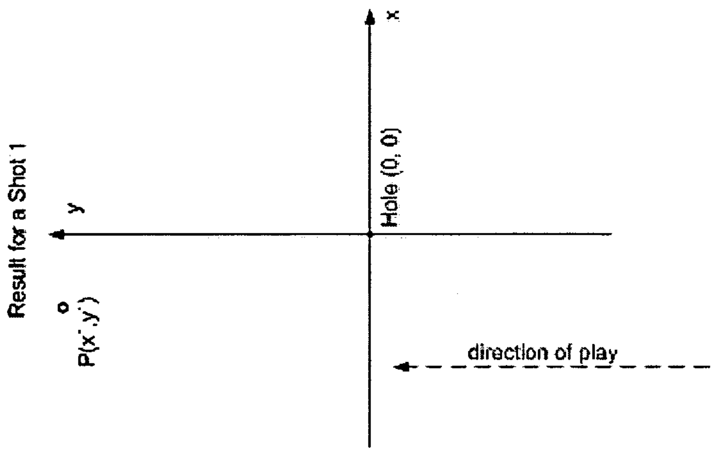
Figure 7:
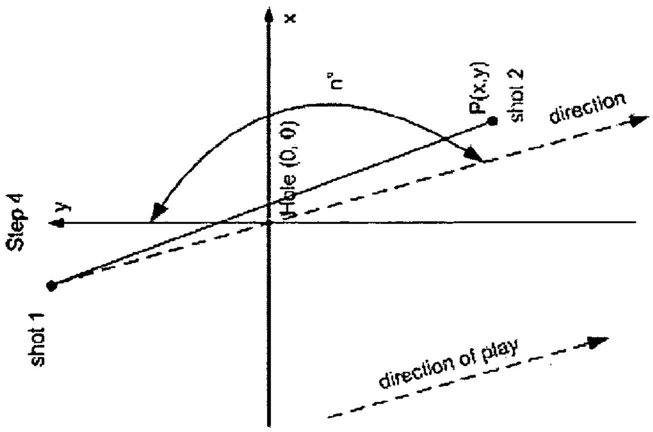
Figure 10:
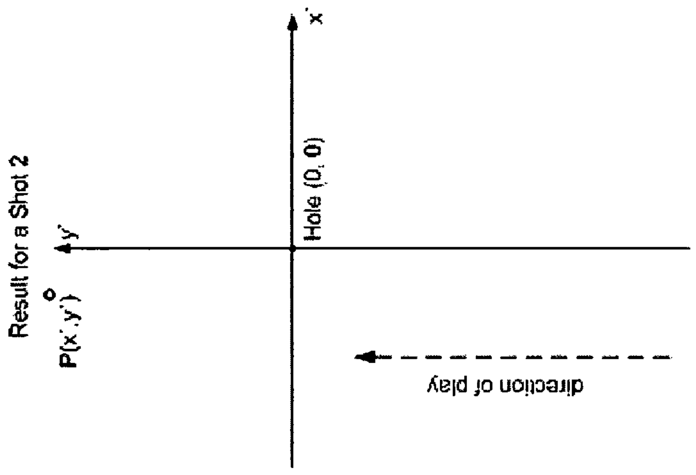
Figure 11:
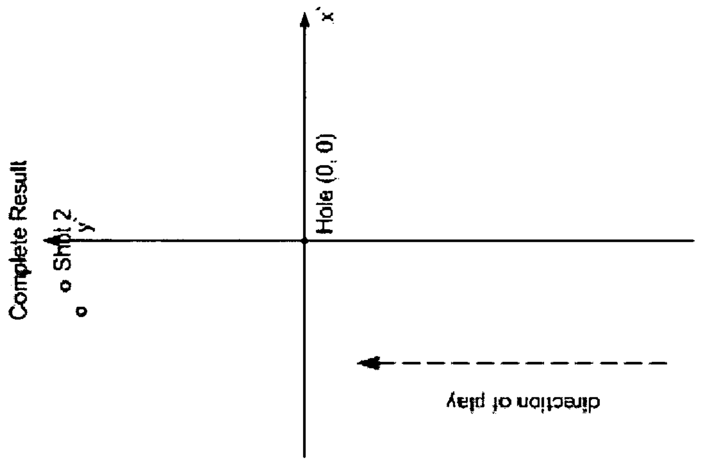

On FIG. 2, hole result is depicted. For graph calculation and diagram generation, the target for each shot is projected in point (0,0). Then, by algorithm described in FIG. 2, the coordinates of point for each shot are calculated. FIG. 3 illustrates how the direction of the shot is found, as in Step 1. FIG. 4 shows the turning angle being found relative to the initial axes of reference, as in Step 2. FIG. 5 provides illustration of a Step 3, wherein the axes X', Y' and shot point are turned through angle n°, resulting in a graph illustrated in FIG. 6, showing a result for a shot 1 or a first shot. A similar method is used for generating the point of a second shot or subsequent shot, as shown in Step 4, Step 5, Step 6, Results for a shot 2 in FIGS. 7, 8, and 9, respectively, with the FIG. 10 showing a result for shot 2. Then, the graphs for each separate shot are merged together and we receive the complete Hole Result, illustrated in FIG. 1.

Referring now to the base software as a service (SaaS) methods and systems of the present invention, FIGS. 12-31 illustrate screen shot images of user interfaces for user input of information and coordinate data and for viewing statistical and analytical outputs.

In addition to the visualization set forth hereinabove, base or foundation software methods and systems of the present invention provide for statistical analysis and corresponding outputs, including tabular and/or diagrammatic representation of golf performance by a user. The systems and methods further provide for software operable on a server computer on which the statistical analysis is performed on data uploaded from a portable device or unit having global positioning satellite (GPS) functionality. Preferably the user inputs predetermined information to the device during the course of golf play; these inputs are combined with GPS data or data points that correspond to the user's ball location, including respective start point and target areas, including an initial start point and final target area for each golf shot, wherein a series ultimately ends in a final shot successfully reaching a final end point or hole.

Preferably, as set forth herein, while the analytics and visualization are provided via a graphic user interface on a display, with the shot data, analytics data, and visualization data being stored and accessible on a remote server computer via the Internet, for inputting the shot data a device-specific software is installed and operational on the input device to provide a user interface for the user inputting information regarding start points and target areas coupled in a series of at least one shot (formed by the start point and actual landing of the ball with respect to the target area) and for corresponding GPS data to be captured for those shots as well as for the target areas. An upload mechanism is operational on an individual user device or unit that is operable by an application user. The unit is equipped with global positioning satellite (GPS) functionality. Preferably, the present invention methods and system are operable on such a GPS-operable unit so that the application user of the unit inputs primary and secondary information that relate to his/her coordinates. Primary information includes a first position and a target area of the application user to the unit. In one embodiment, the first position and target area relate to a golf course, and more particularly to a hole playable on a golf course on which the application user is positioned to play. The present invention systems and methods are adaptable to be used on or retrofitted to existing GPS golf play units, although other handheld GPS-operable devices may be used alternatively. Graphic user interface modifications and software of the present invention are uploaded via a software as a service (SaaS) operation from a network connected to the worldwide web ("the web").

Figure 12:
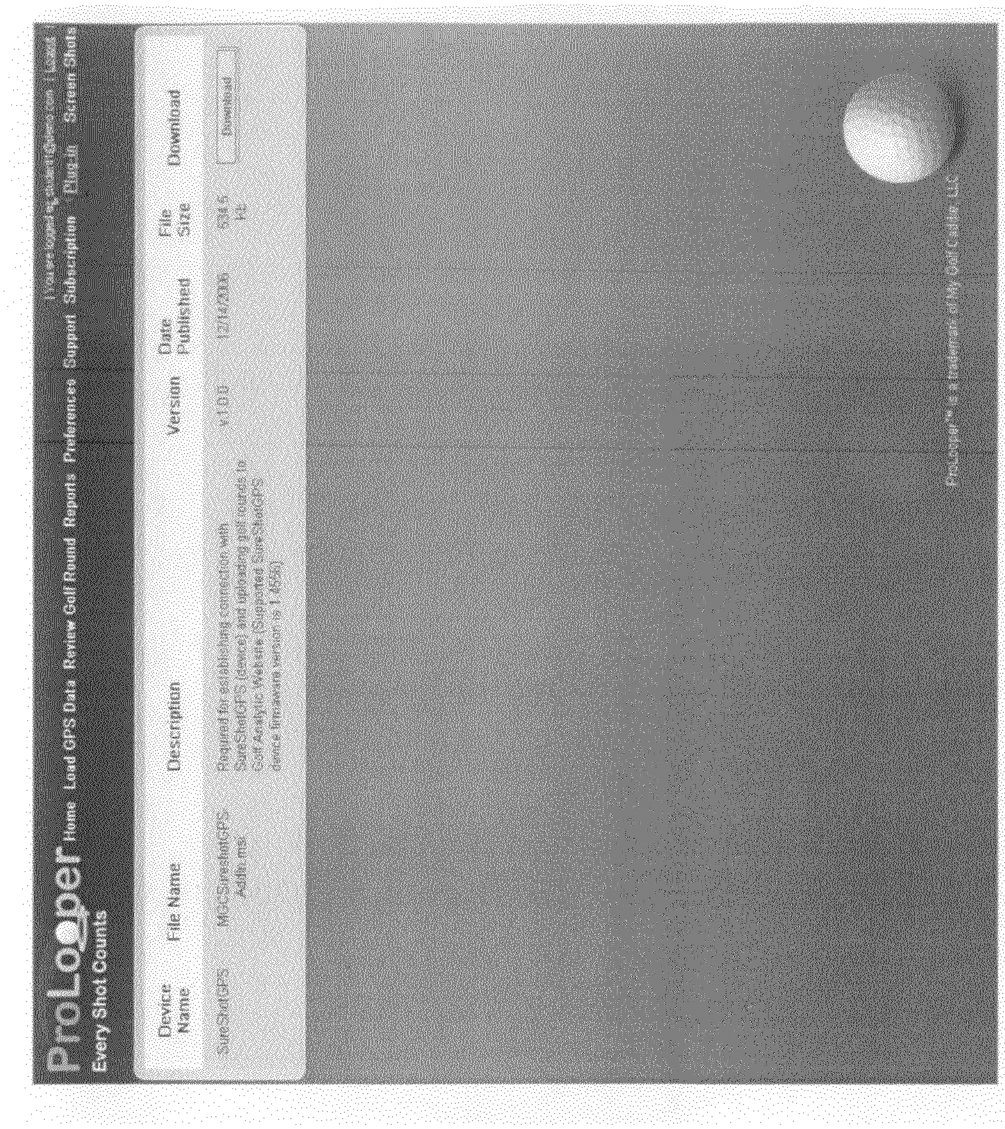
FIGS. 12-31 are screenshot images of user interfaces for entering information and viewing analytical outputs according to the present invention.

Regarding basic functionality of the system and methods of the present invention, initial setup includes downloading a Plug-In and installing it on a personal computer (PC) or other computing device for providing a connection between the PC and a remote server computer data accessible via a web site. FIG. 12 illustrates a screen shot of a website page for initial set-up.

Figure 13:
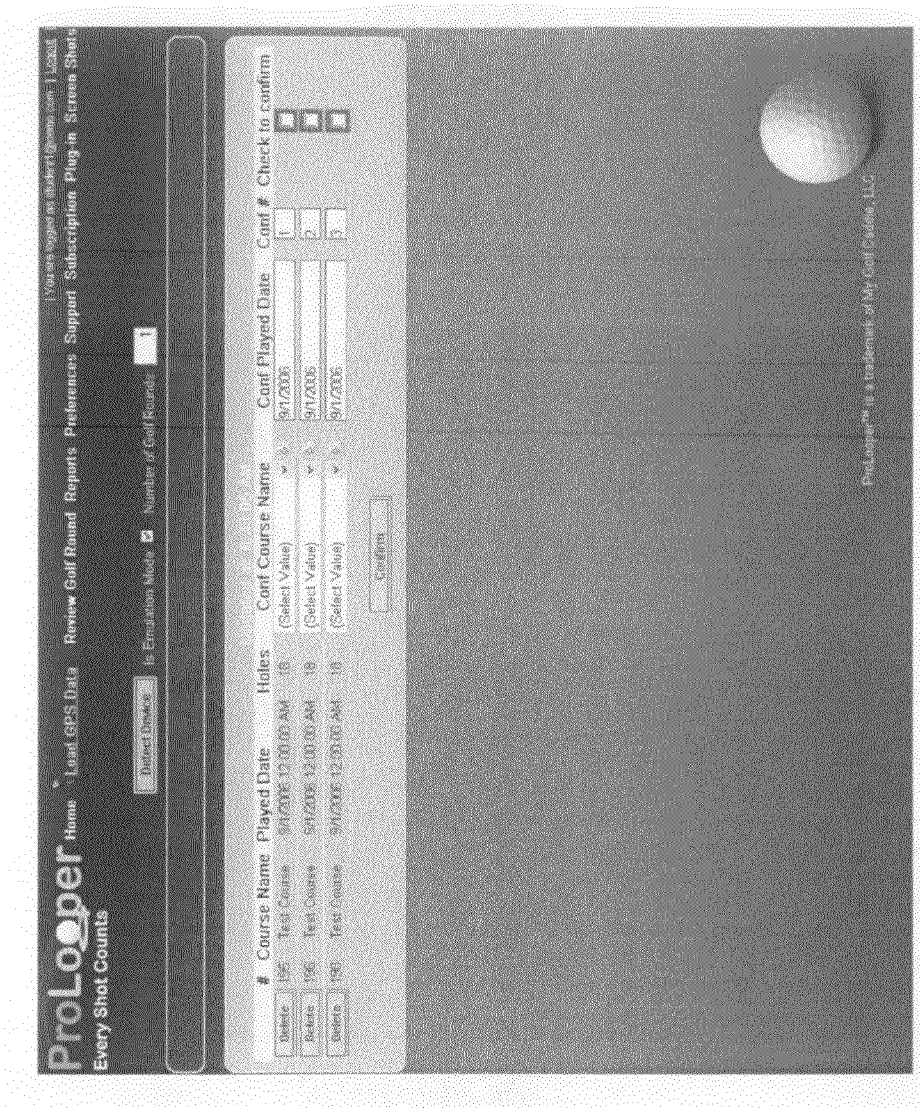
Figure 14:
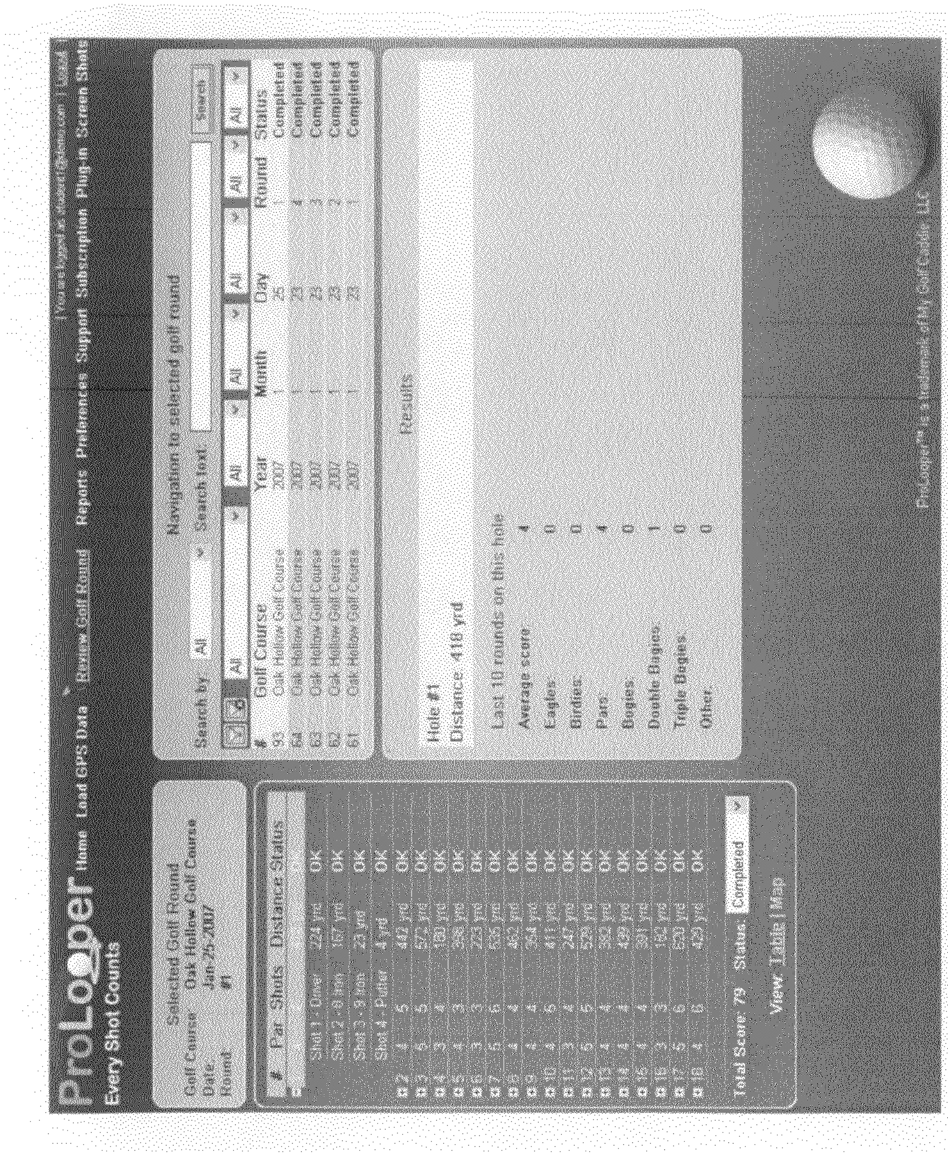

As illustrated in FIG. 13, the software is operable to provide for the user, after logging in, the first thing to connect the handheld shot mark data capture input device to a PC via USB cable. The user can click-select the "Detect Device" button or option on a Load GPS Data screen, for example as shown in FIG. 13. Any rounds that are currently captured on or input into the device during golf play will be listed on this screen. The software is operable to allow the user to verify the course and date, and then checks to confirm. When the user click-selects the "Confirm" button, the rounds are then available in the "Review Golf Round" screen, which is viewable on a display on a computer. Preferably, the data captured on the device is uploaded to a server computer and the display or screen is provided via a website that is accessible by a user with any web-enabled handheld or other device, such as a computer, that is web-connected or in communication with a network through which the website-based content is delivered. On this screen view or graphic user interface, the software is operable to allow the user to select or indicate the round he wishes to review. The status of a round that has not been reviewed yet is preferably marked or noted as having the status of "Uploaded". A partially reviewed round will be indicated as "Changed", and a completely reviewed round is indicated as "Completed" on the user interface. In one embodiment of the present invention, the rounds will not be included in reports unless the round is completed.

In one embodiment of the present invention, the systems and methods provide for at least two different ways to look at or review a round with visual representations via the website interface, specifically "Table" and "Map" views, as illustrated in the figures. Table view is an easy to view screen that just lists each shot, along with the distance, as illustrated by the website screen shot in FIG. 14. To edit the properties of a particular shot, a user simply has to click-select or otherwise indicate or select a given shot represented on the user interface. The user can add situational data such as lie, lay, slope, club, type of swing, weather information, etc.; preferably, this additional information is added via the website user interface after the round is completed and uploaded, rather than being entered or input through the device during play so as not to interrupt or slow the flow of the golf game while it is in progress. However, this preference is based upon currently existing handheld GPS devices, in particular that are "purpose-built" for use with golf alone, which typically lack additional memory, speed, and ease-of-use to include more inputs on the course. However, if a device is being used by a third party, such as a caddie, then additional inputs can be made with an adequate handheld device on the course. Normally, for an individual user without a caddie entering the information, it is preferably not to interrupt the flow of the game by making these inputs on the course during play.

Figure 15:
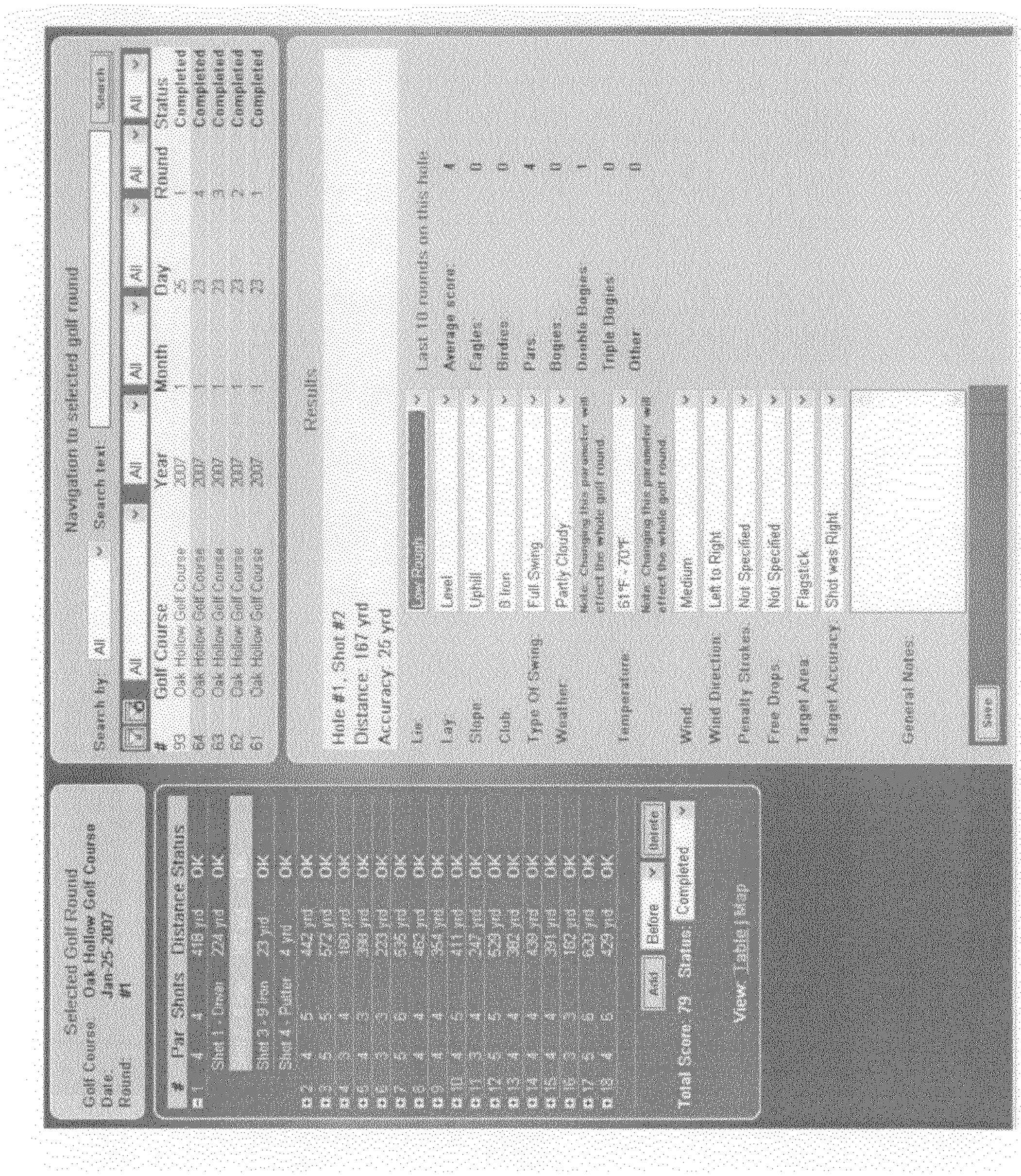

As illustrated in FIG. 15, a screen shot is provided to illustrate when the user selects or indicates a lie of "green", the next shots on that hole will preferably automatically default to green, and the club will automatically change to putter, without additional inputs from the user required on the course. There are a few other examples like this, all designed to save the user time when reviewing a round. Penalty shots are handled differently, as set forth hereinabove, for the sake of illustration of the present invention, but not as limitations thereto.

Figure 16:
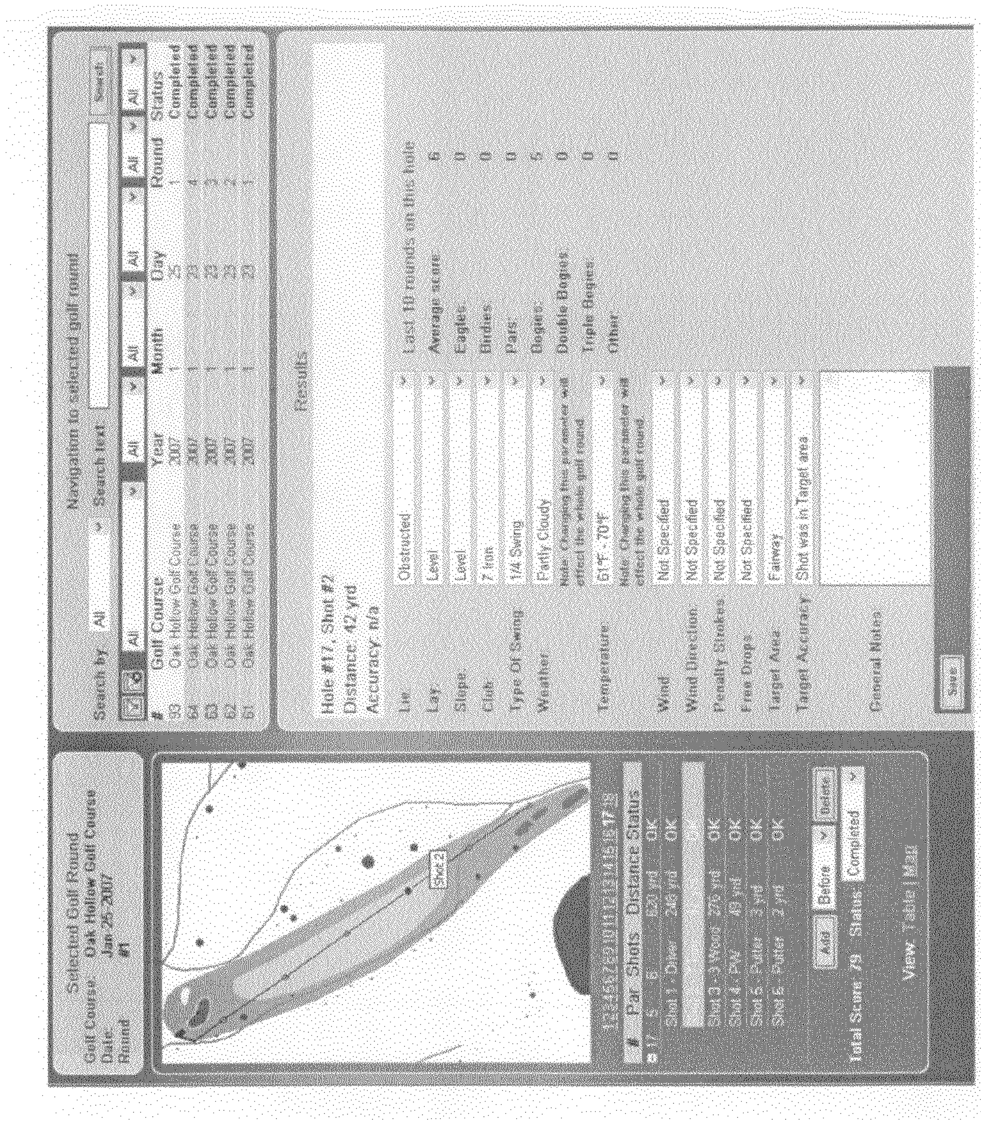

Another option for reviewing a golf round is with the Map view user interface, as shown in FIG. 16. This graphical representation of a golf course is provided for golf course play where those courses have been mapped by a GPS coordinate system, aerially, or otherwise depicted approximately to scale or at least representative of the course layout and distances with respect to each hole. If the course the user is reviewing does not have a map available for any reason, then a blank screen may be provided that indicates that the course is not mapped or that a map is not yet available.

The systems and methods of the present invention allow the user to review shots the same way here, by clicking on the shots below the map. It also allows users to click the actual map, where the red dot shows the landing point of that particular shot. A straight line is shown on this map for this feature at the time of the invention; other visualization is also considered within the scope of the present invention. Preferably, the user sees the actual line that his/her shots have taken, from the tee to the hole, or intermediate shots therebetween.

In the contingency for penalty shots, if a user hits his/her shot into the water, they can't stand next the ball and mark the location with the device. The system allows the user to click on the map to show where a particular shot landed. If no map exists, the user can estimate the distance. The user will go through each shot. When finished the round changes to "Completed" status, and is now part of the statistics in the Reports section (see FIG. 16).

This is part of the Reports section. This first report is the Overall Statistics mode. It shows the selected round (you can select any one round from your entire history), the last round, then the past 10, 20, 30, and all rounds to the right. It shows stats for score, average score on the various pars, greens in regulation (GIR), sand save percentage, and driving accuracy percentage.

Figure 17:
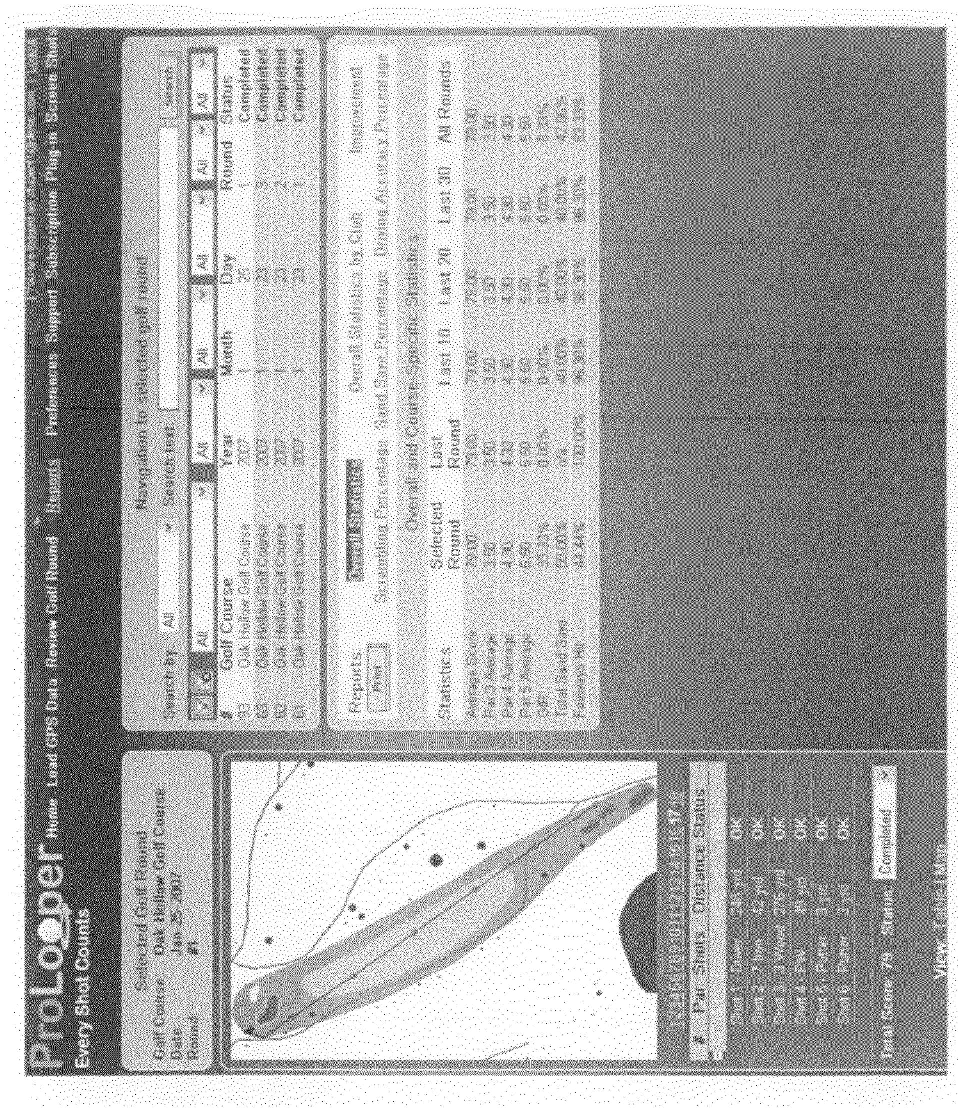

The Reports section as illustrated in FIG. 17 also allows a user to filter only the rounds they want to see. If the user wants to view only rounds at a particular course, they can select that course from a drop-down menu (filter button). Year, month, and day filters also exist.

Figure 18:
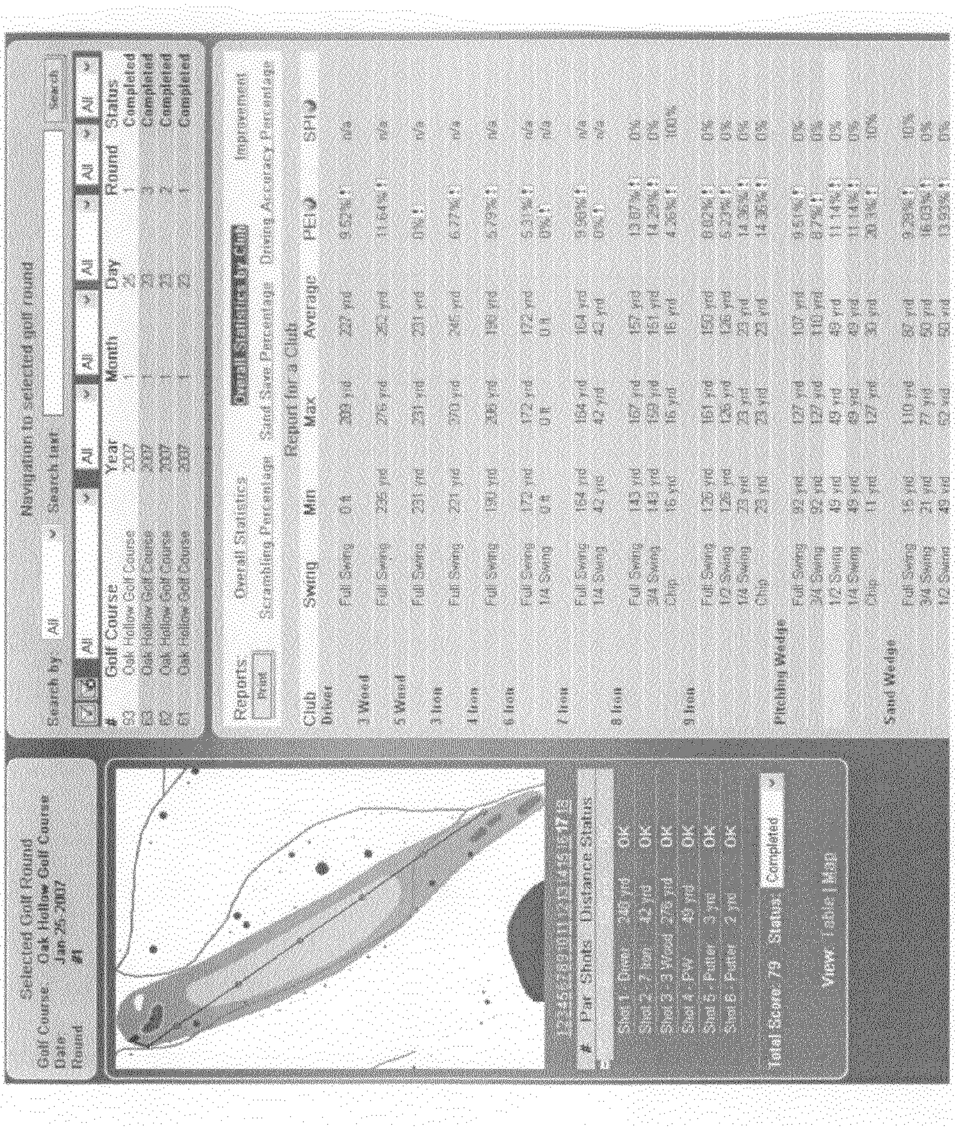
Figure 19:
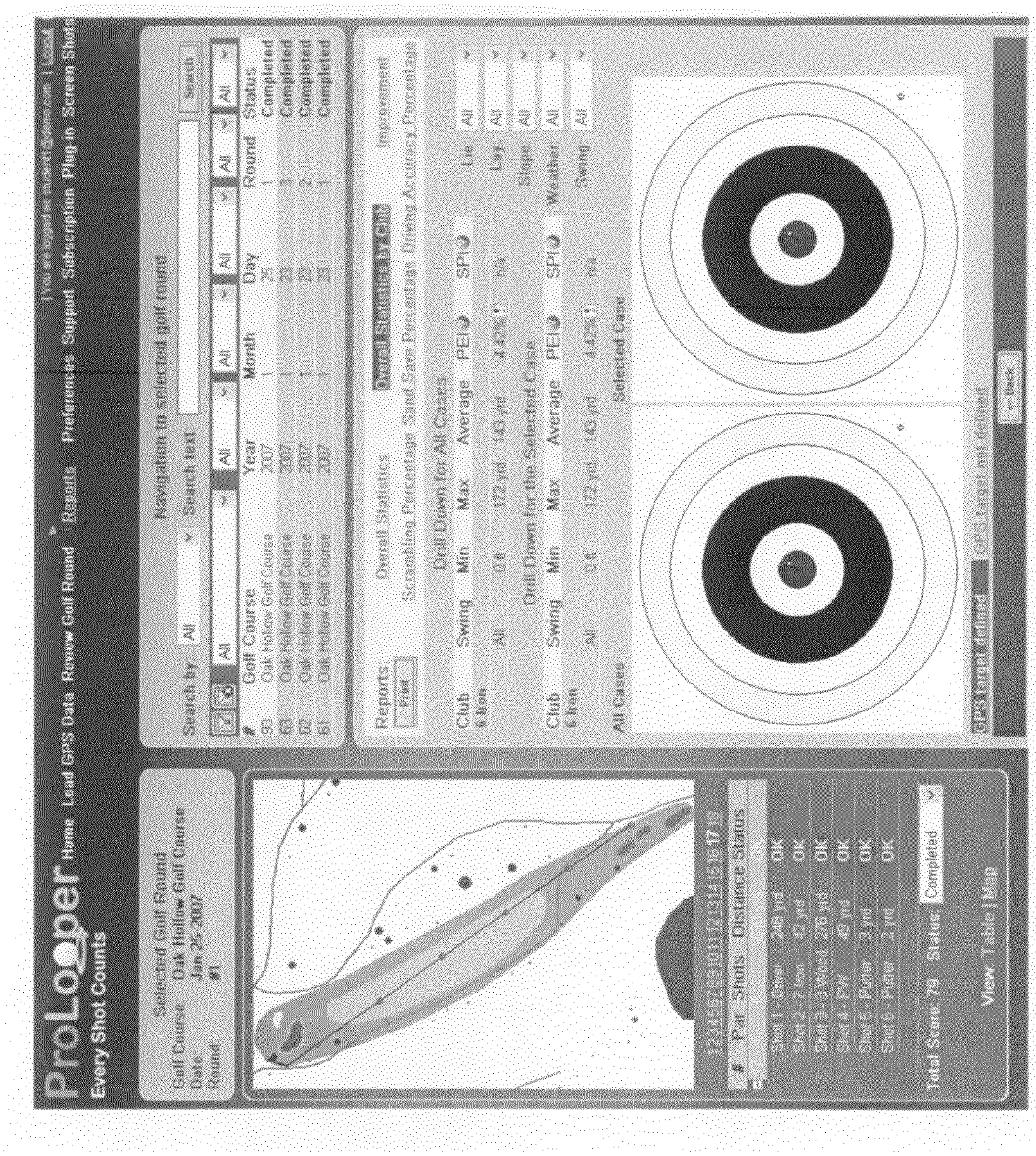

FIG. 18 provides a screen shot view showing an Overall Statistics by Club report. It shows the minimum, maximum, and average distances for each club (and type of swing) that you've used. The PEI (Percentage Error Index) shows you how far you're missing your target by. For example, if I have 100 yards to the pin, and I hit my shot 10 yards away, my PEI is 10%. SPI (Scoring Percentage Index) is a percentage of how often you hit a shot to within 6 feet of the hole.

Figure 8:
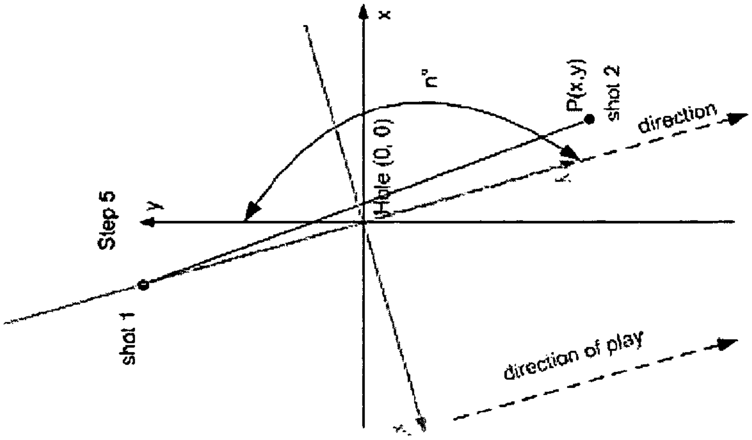
Figure 9:
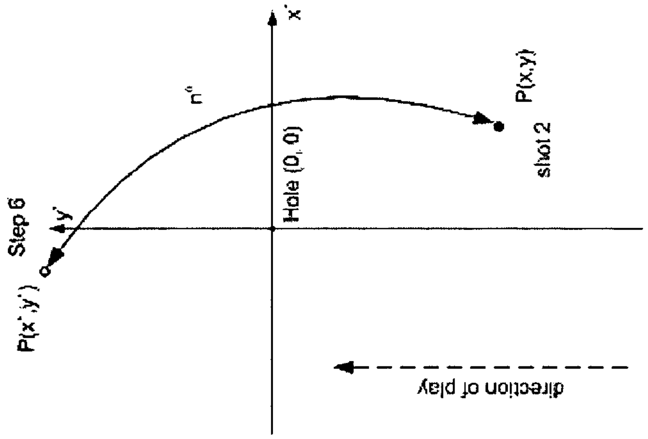

From the same report, as illustrated in FIG. 8, a user can get a closer look at data relating to the accuracy of each club by clicking the club. The first screen that you see below shows you how accurate you are with that particular club, in relationship to the flagstick. Only shots that have a target of "Flagstick" will show here. The left chart is for all shots with that club. The right chart can be further dialed down by clicking the drop-down boxes on the right side of the screen. If you only want to see only those shots out of a fairway bunker, off an uphill lie, out of heavy rough, etc., then the user can specify that at this point.

Figure 20:
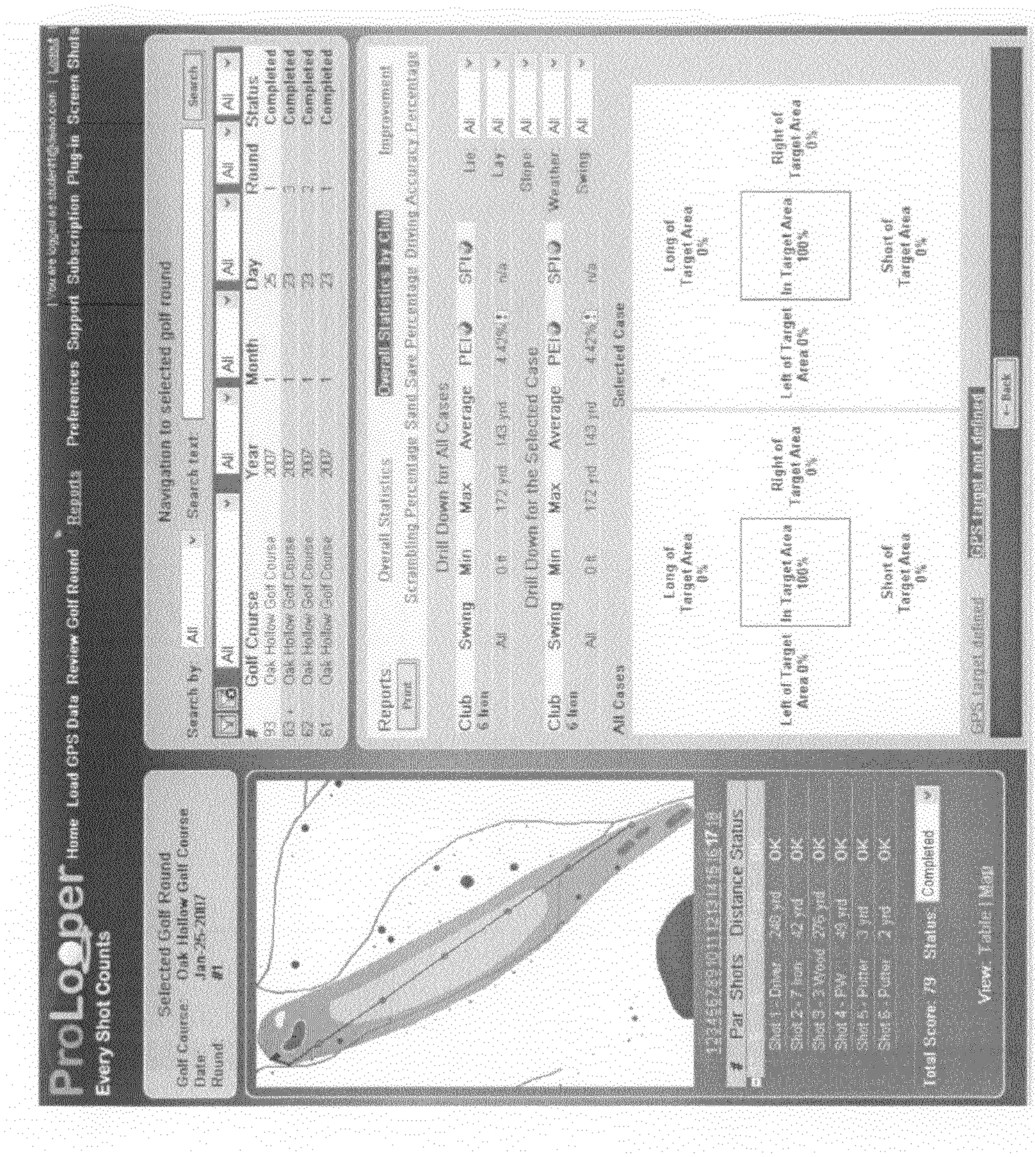

For those shots that are not targeted at the flagstick, the present invention has provided a label for it indicating a "Target Area". By clicking the link below the charts as illustrated in FIG. 20 that is labeled "GPS target not defined", the user will see the indicated user interface and graphics. Same goes for the left chart showing all shots for that club, and the right being selectable.

Figure 21:
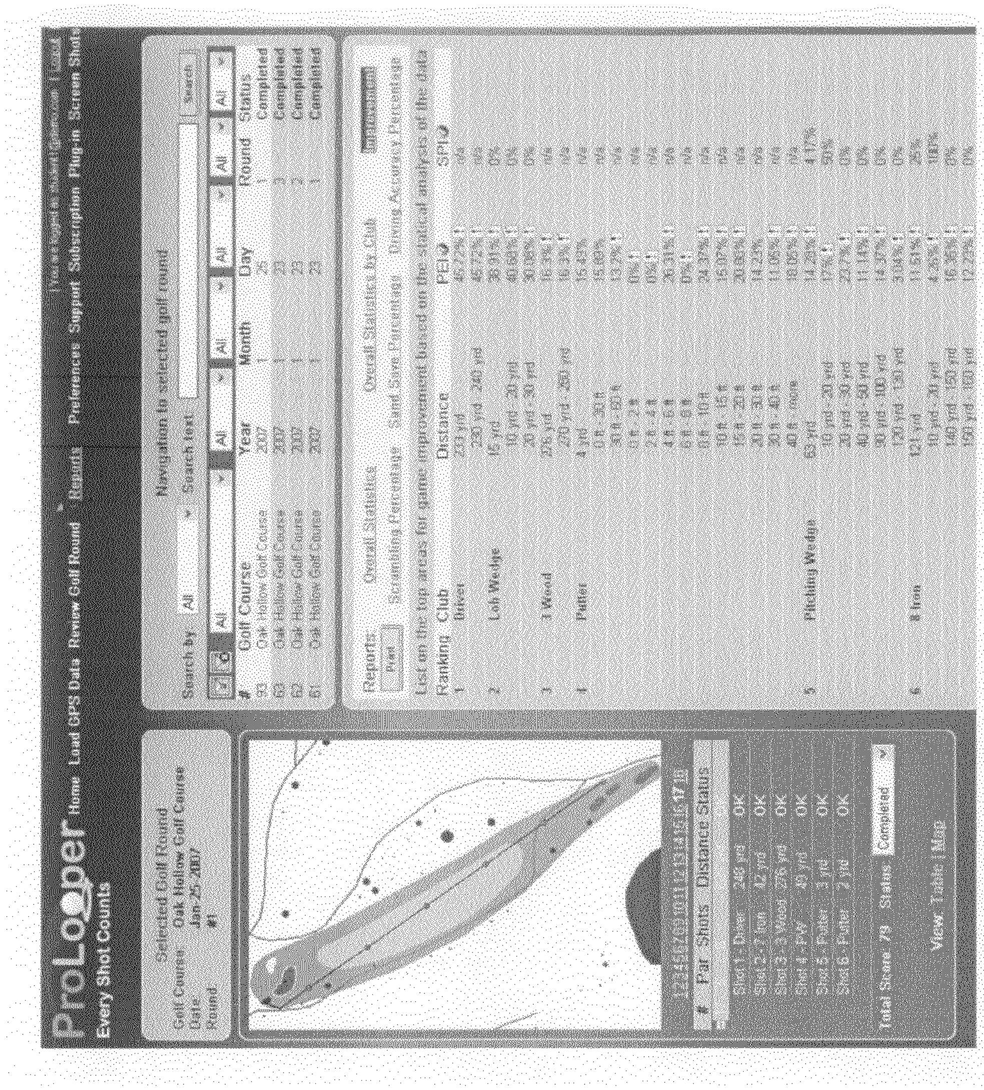

The next report shown in FIG. 21 is the Improvement report. This shows a list of clubs, with the clubs that have the highest error percentage at the top. The higher the PEI, the worse the user is with that club. Those are the clubs with which the user needs to work on improvements.

Figure 22:
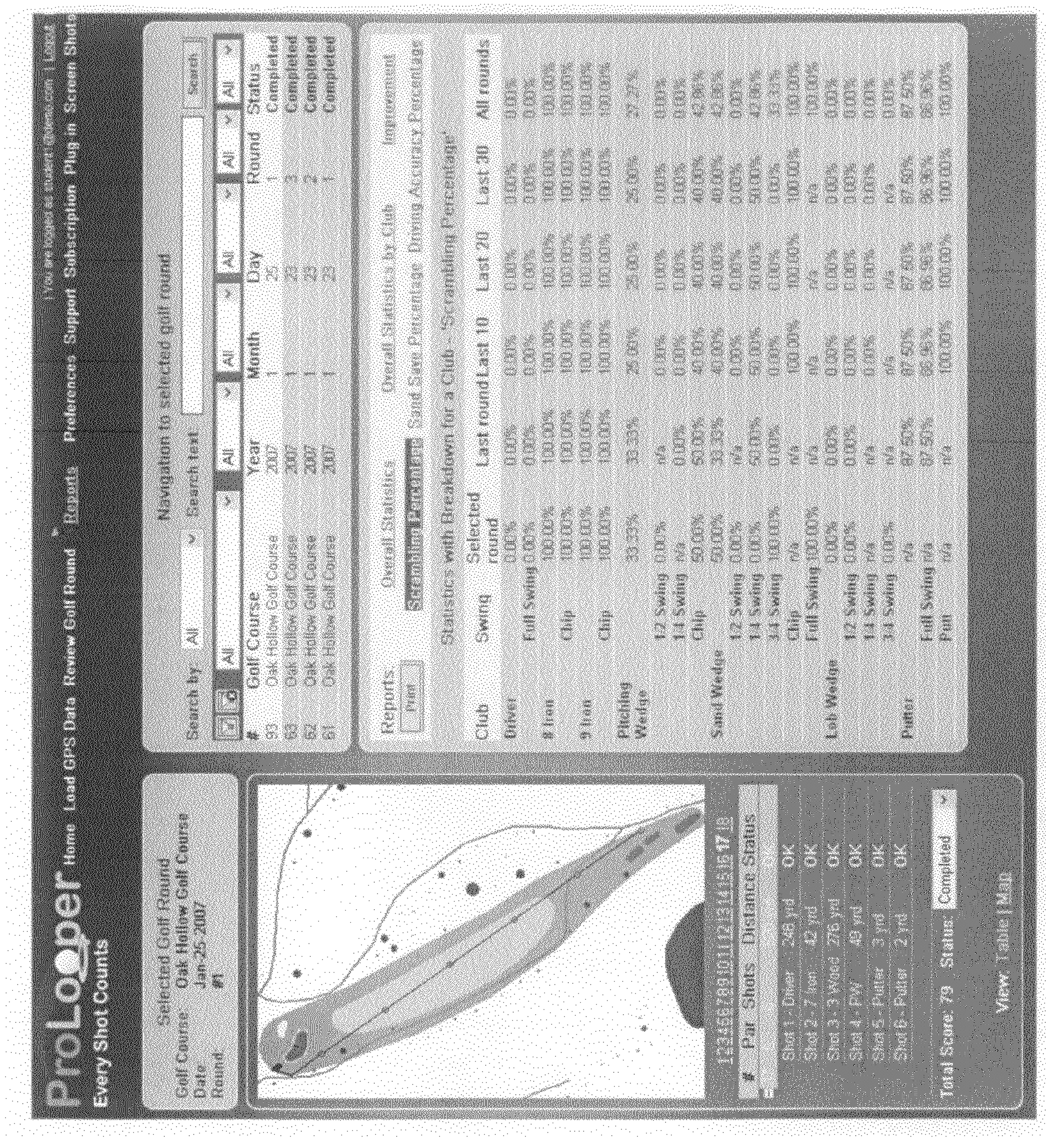
Figure 23:
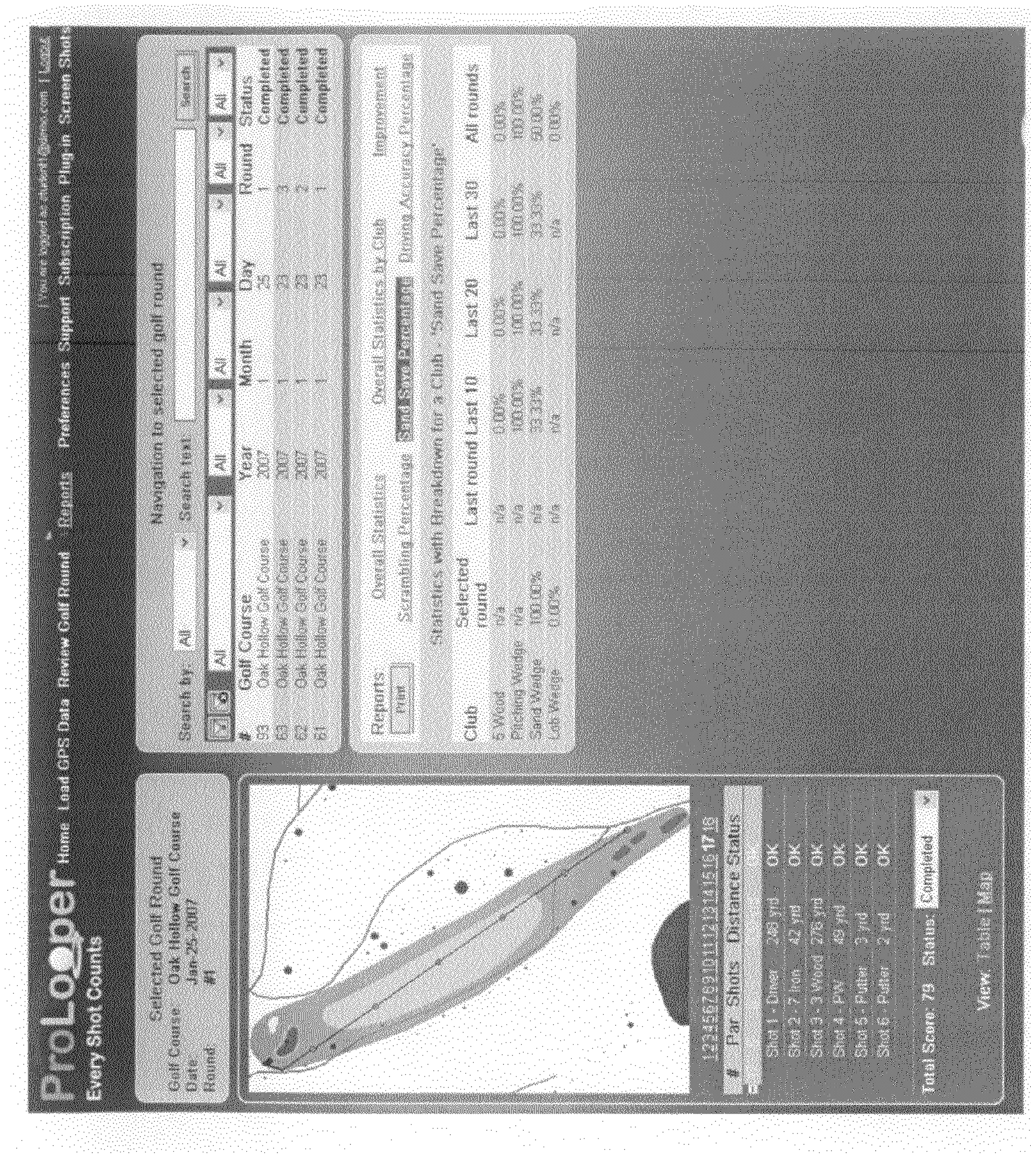
Figure 24:
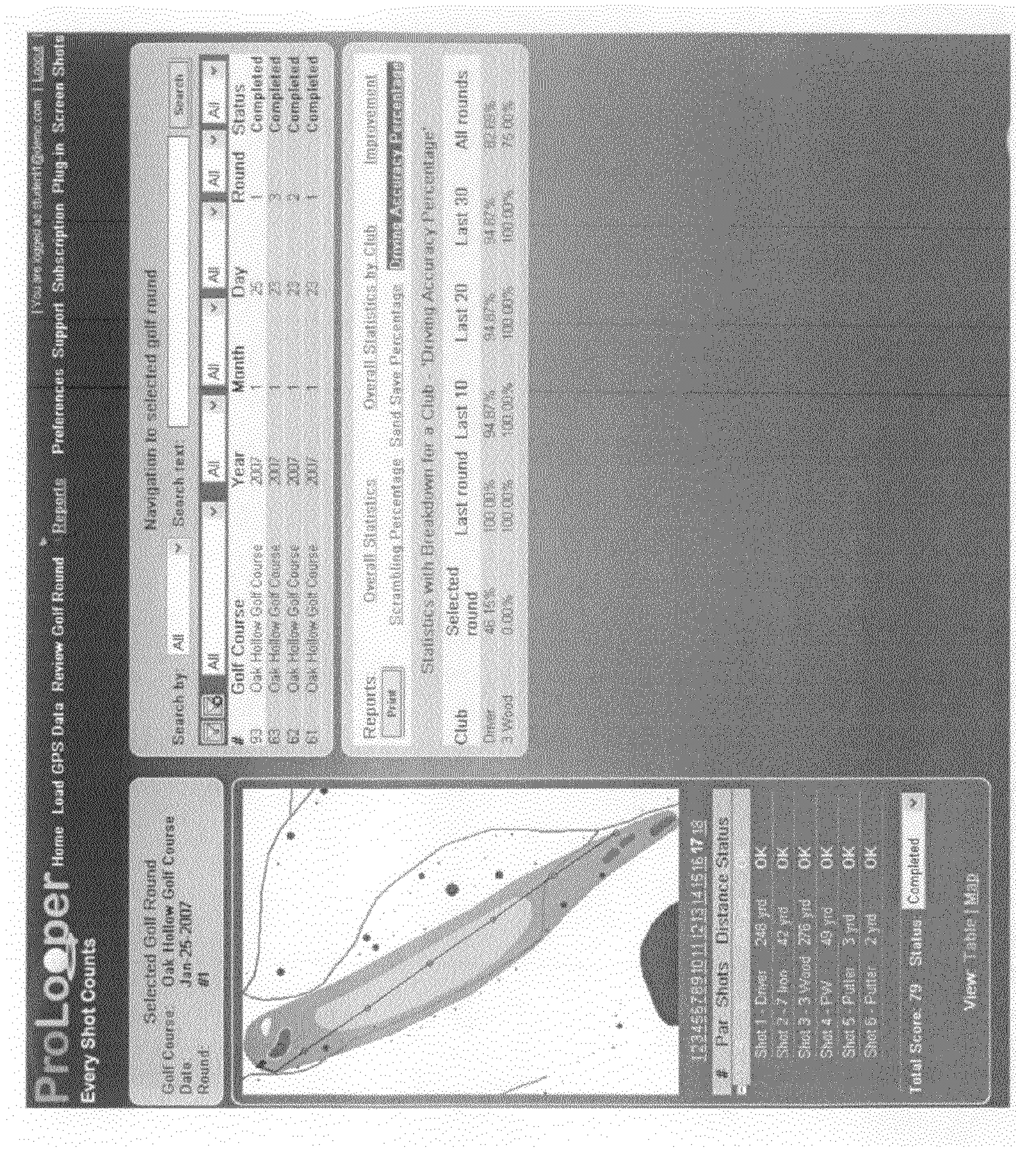

The next report illustrated in FIG. 22 shows a Scrambling Percentage report. This shows the user how often he/she makes par when he/she misses a green in regulation. Sand save reports show how often the user gets up and down out of a green-side sand bunker, as illustrated in FIG. 23. Driving Accuracy shows how often the user hits the fairway from the tee, as illustrated in the screen shot from the web-based user interface for FIG. 24.

Figure 25:
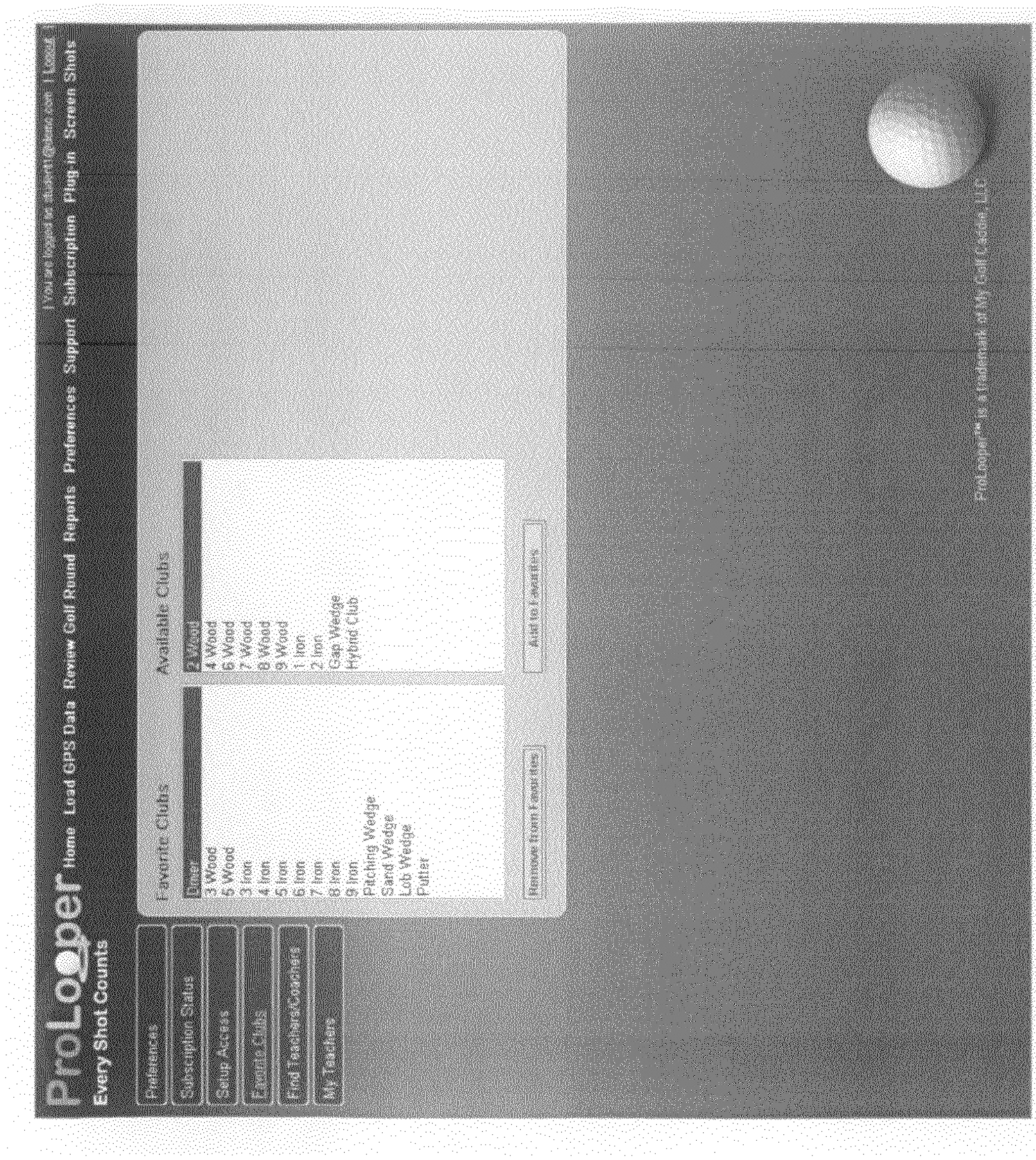

The system and methods of the present invention also provide for options that permit a golfer to set up favorite clubs, which prevents them from having to scroll through the entire list of clubs when reviewing shots on the user interface; this is illustrated in FIG. 25. To edit the properties of a particular shot, just click the shot. The user can add situational data such as lie, lay, slope, club, type of swing, weather information, etc.

If the user selects a lie of "green", the next shots on that hole will automatically default to green, and the club will automatically change to putter. There are a few other examples like this, all designed to save the user time when reviewing a round. Penalty shots are handled differently, as set forth hereinabove.

Figure 26:
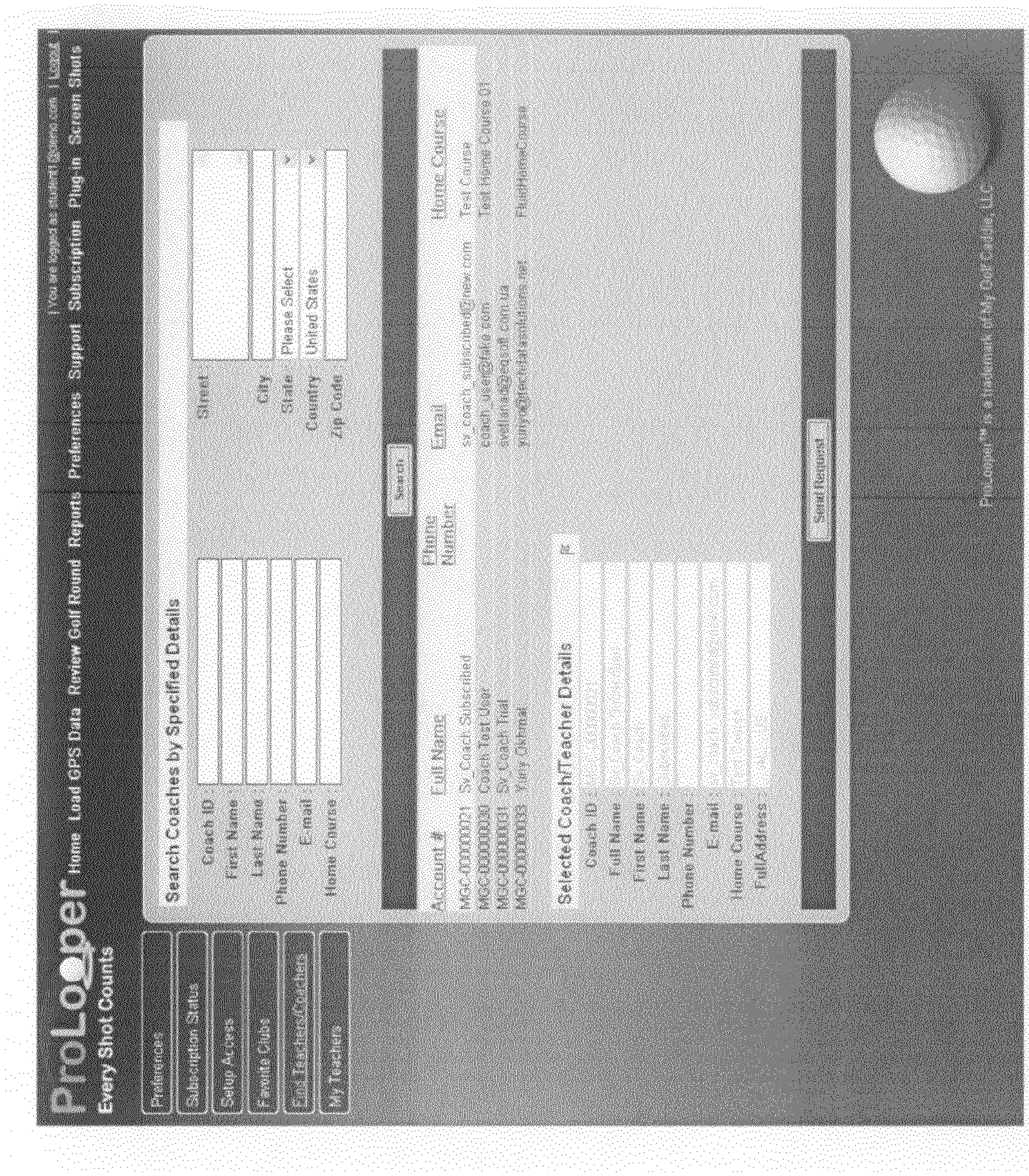

The system and methods of the present invention also provide functionality that permits a user to allow or provide access to their coach or PGA professional. In one embodiment of the present invention, this is done by a user making a click-select of the "Find Teachers/Coaches" link in the Preferences section. (The coaches and PGA Pros check a box that identifies them as a coach/teacher when they sign up). The user finds a coach/teacher, and clicks the "Send Request" button or option, as illustrated in FIG. 26.

Figure 27:
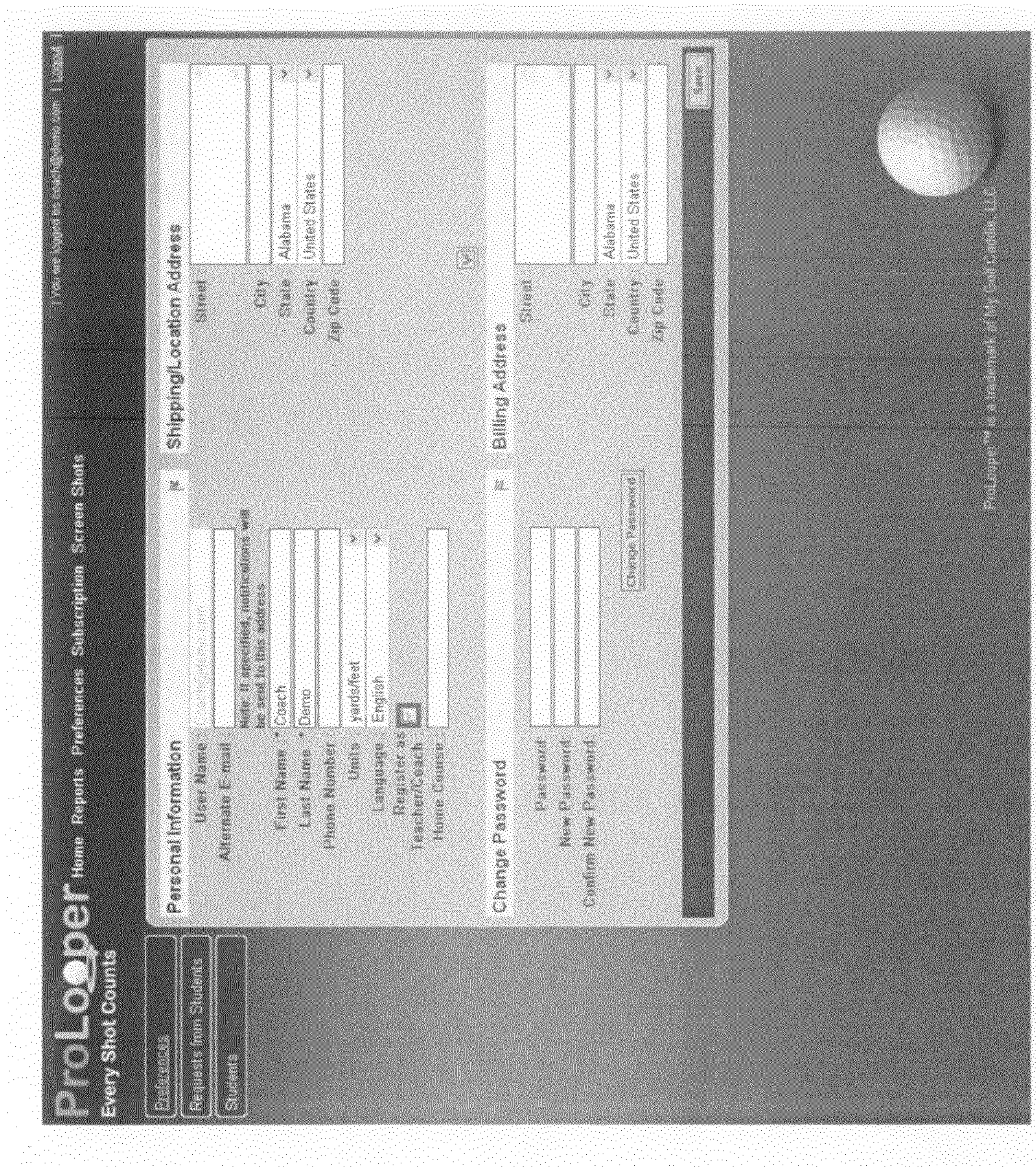

FIG. 27 illustrates a graphic user interface that provides options for coaches and teachers sign up to receive notices and review rounds actually made by their students who have extended access to the data to them.

Figure 28:
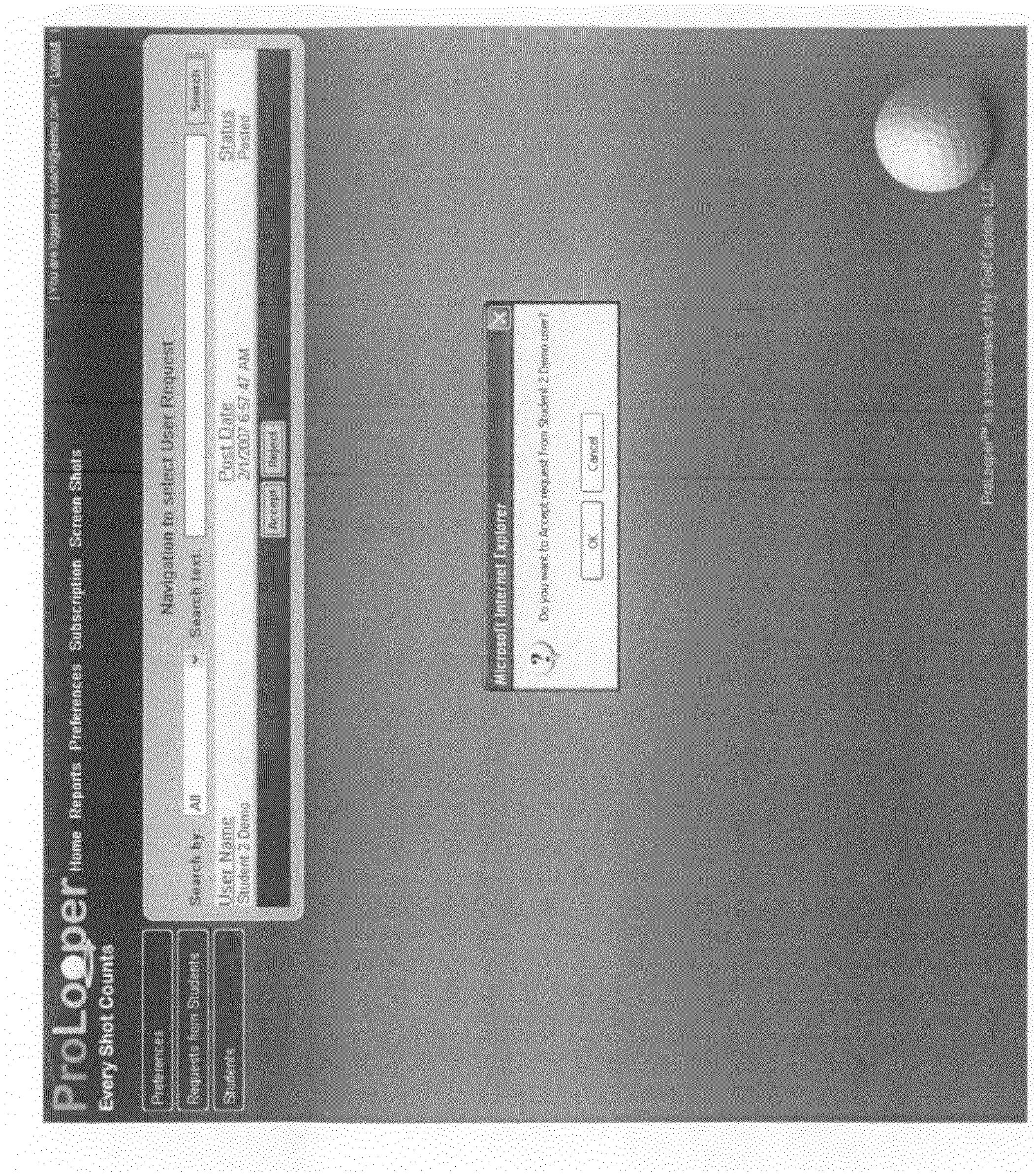
Figure 29:
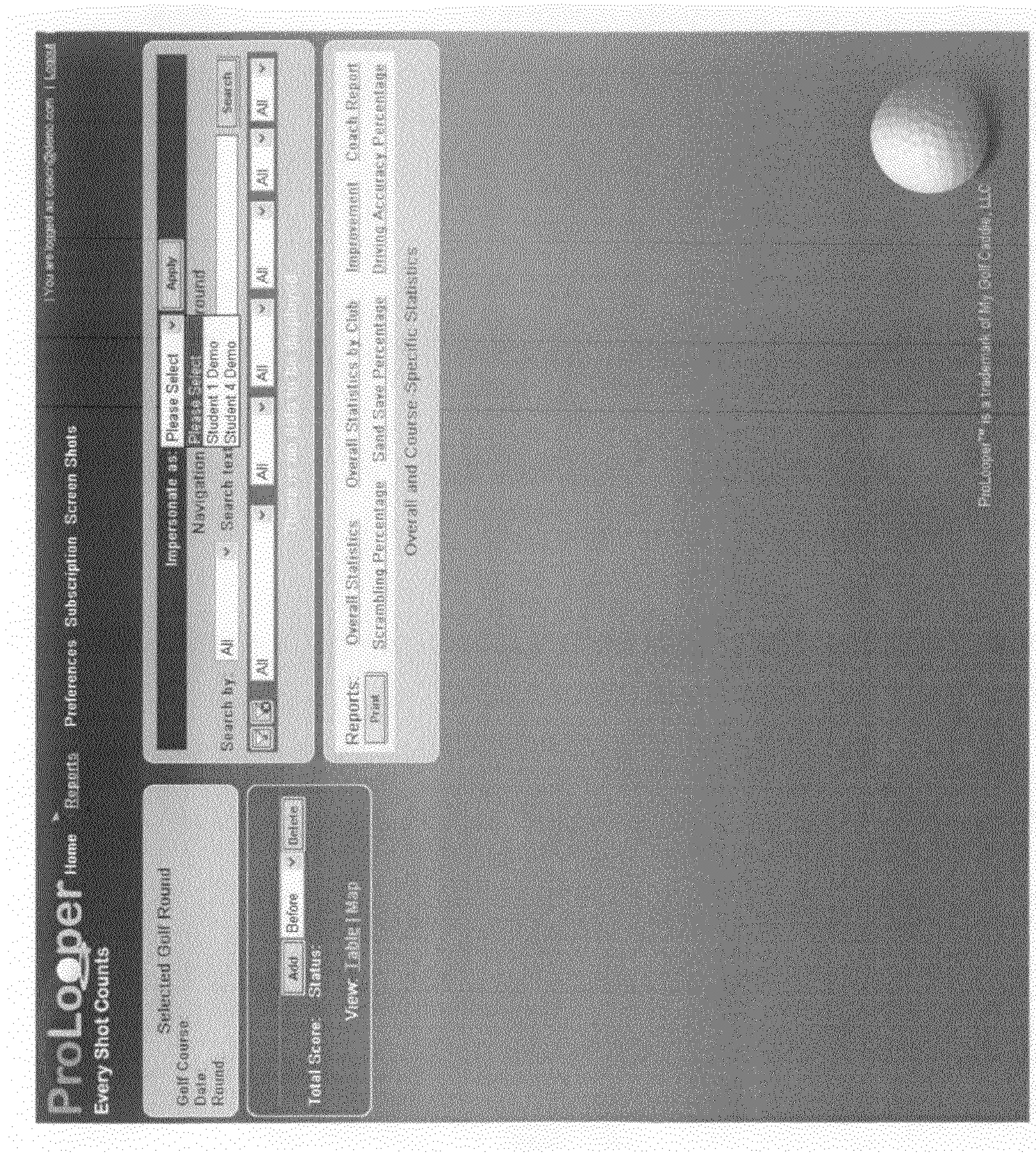

After a student sends a request to a coach/teacher, the coach/teacher is provided the option to log in for viewing an interface as illustrated by FIG. 28. Once accepted, preferably the coach/teacher can then view, but cannot make changes to, all the reports that the golfer or user also reviews. The coach/teacher click-selects or indicates the desired golfer from a listing such as the "Impersonate as" drop-down, and all of that golfer's reports are available, as shown in the FIG. 29.

Figure 30:
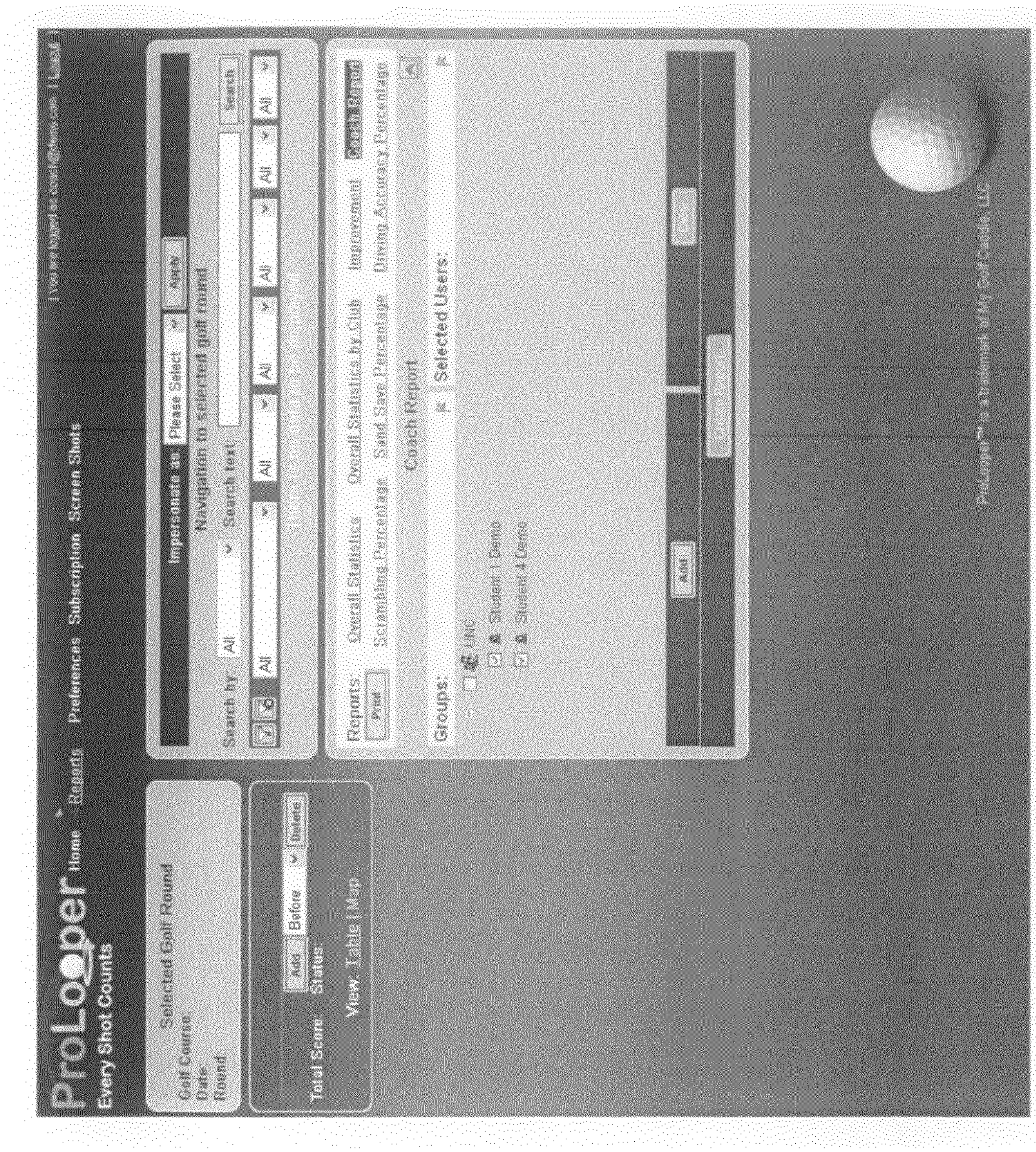

As illustrated in FIG. 30, the systems and methods of the present invention provide coach/teacher with the option to create a report that compares multiple golfers or users, preferably side by side. By click-selecting another option, such as "Coach Report", they see a list of all golfers they have access to. They then select which of these golfers to compare, and click-select "Add". Preferably a multiplicity of golfers or users' data is available for review and comparison by the third party coach/teacher.

Figure 31:
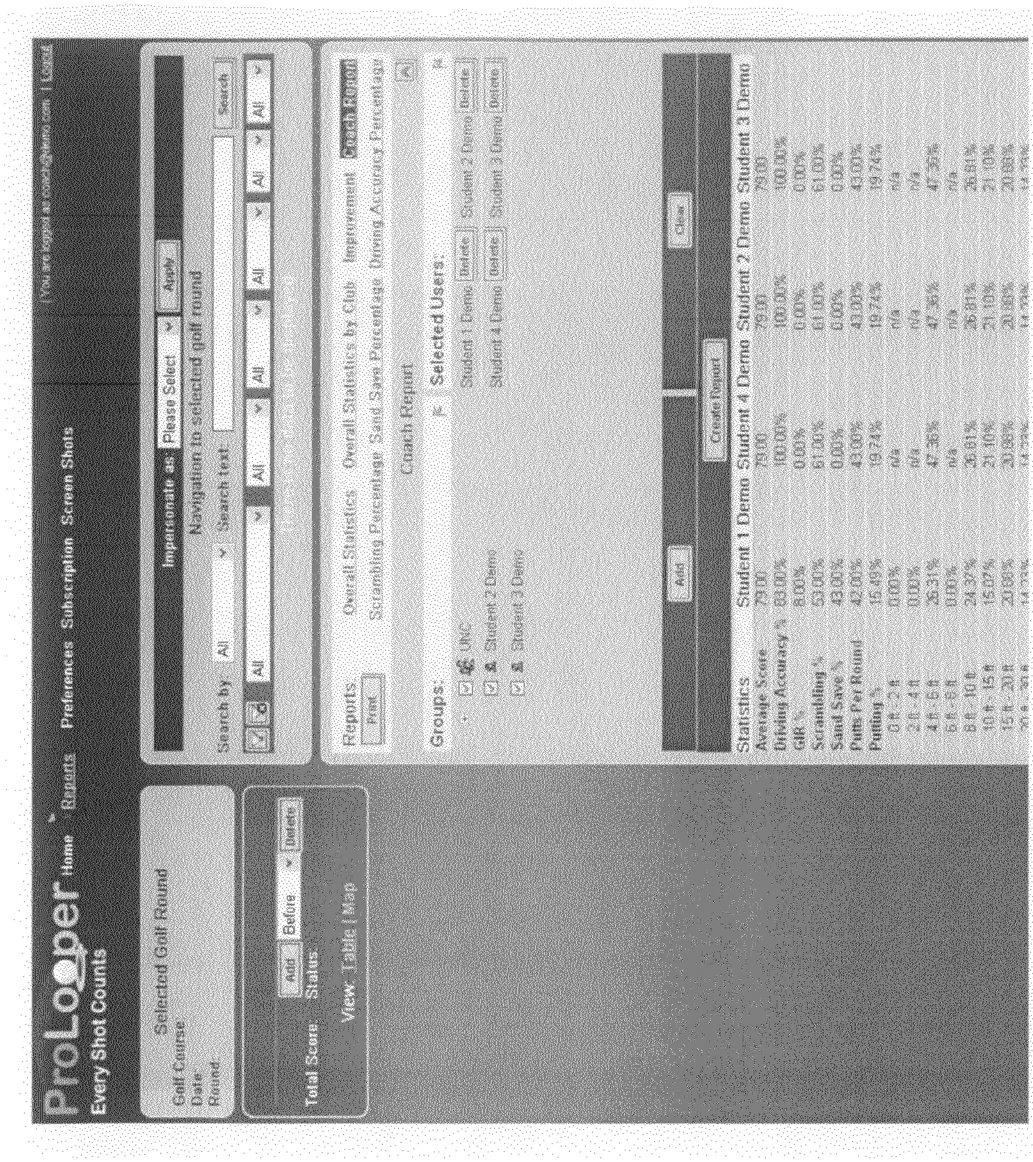

As illustrated by the screen shot in FIG. 31, the user then click-selects a "Create Report" button to view the report, showing those selected users or golfers in a comparative manner, preferably with data in tabular format side by side, but optionally in an overlay graphic of shots or other visualization that facilitates comparison or analysis.

Certain modifications and improvements will occur to those skilled in the art upon a reading of the foregoing description. By way of example, automatic conversion between English units of measure (such as feet, yards) to metric equivalents may be included for user convenience. The above mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention and the following claims.

What is claimed is:

1. A system for providing statistical analysis for golf performance of a user comprising: a portable input device operable for capturing shot data, including GPS data, during the golf play of a golfer, the device being further operable to transmit the shot data to a computer for reviewing the shot data and analysis of the shot data through a graphical user interface viewable on a display; the computer further including software operable for providing statistical analysis of the shot data; wherein the user provides inputs and coordinates of a series of corresponding starting points and user defined distance and direction target areas, wherein the target area is a location in a fairway, in a rough or on a green, and recordation of actual shot locations from those starting points during the golf play via the device; and wherein the statistical analysis includes outputs having detailed diagrammatic representations of golf performance analytics, including scattergraph diagrams having information relating to the directionality of any shot to be uniformly and consistently oriented to provide a zeroed-out orientation for each shot, thereby assisting the user/golfer with identification and understanding of errors and trends related to shot misdirection and the corresponding causes related thereto.

2. The system of claim 1, wherein the statistical analysis of the shot data includes outputs selected from text, tabular, diagrammatic, image-based outputs, and combinations thereof.

3. The system of claim 1, wherein the statistical analysis includes trends in the golfer's golf performance over a predetermined period.

4. The system of claim 1, wherein the input device is a handheld device.

5. The system of claim 1, wherein the input device has GPS functionality.

6. The system of claim 1, wherein the shot data includes GPS data.

7. The system of claim 1, wherein the computer is a remote server computer (RSC) and the shot data is uploaded from the device to the RSC through a communications network.

8. The system of claim 1, wherein the unit is operable to receive from the golfer shot data inputs including GPS data relating to golf shots, and wherein the unit is operable to transfer the shot input data to the computer for analysis to be performed by software operating thereon.

9. The system of claim 1, further including a unique user identification associated with each golfer that is usable by the golfer to access a remote server computer for uploading his data, and for modifying and adding information, including secondary information.

10. The system of claim 9, wherein the secondary information is selected from course conditions, weather, golfer status, equipment specifics, shot corrections, penalty shot positions, and combinations thereof.

11. A method for providing statistical analysis of golf performance of a golfer including the steps of the golfer inputting shot data including corresponding coordinates for a series of shots including a start point and a distance and direction target area, wherein the target area is a user defined location in a fairway, in a rough or on a green, as well as actual shot location throughout a course of play using a GPS-enabled input device; the user uploading the shot data to a remote server computer; software operable on the computer performs statistical analysis of the shot data associated with the golfer; and the software providing analytics outputs to the user via a display having a graphical user interface, wherein the outputs include detailed diagrammatic representations of golf performance analytics, including scattergraph diagrams having information relating to the directionality of any shot to be uniformly and consistently oriented to provide a zeroed-out orientation for each shot, thereby assisting the user/golfer with identification and understanding of errors and trends related to shot misdirection and the corresponding causes related thereto.

12. The method of claim 8, wherein the statistical analysis includes trends in the golfer's performance over a predetermined period.

13. The method of claim 8, wherein the golfer selects review options provided on a graphical user interface on a display.

14. A method for providing statistical analytics of golf performance comprising the steps of:

providing a GPS-operable device operable for a user to input golf shot data during play on a course; wherein the shot data includes corresponding coordinates for a series of shots including a start point and a distance and direction target area; wherein the target area is a user defined location in a fairway, in a rough or on a green, uploading the golf shot data including GPS data to a computer having software for providing analysis of the data;

providing outputs including analytics of the data, wherein the outputs are viewable by the user via a graphic user interface on a display, including scattergraph diagrams wherein the directionality of any shot is uniformly and consistently oriented to provide a zeroed-out orientation for each shot, in addition to text, tabular, graphic, and image-based outputs that include trends information for the golfer, all based upon actual golf play on course situations, wherein the golfer inputs shot data during play, without interrupting the flow of the game, and uploads the shot data for analytics and review online.

15. The method of claim 14, wherein the analytics includes text, tabular, graphic, and image-based outputs that include trends information based upon the shot data input by the user.

16. The method of claim 14, wherein the shot data is based upon actual golf play on course situations.

17. The method of claim 14, wherein the golfer inputs shot data during play.

18. The system of claim 1, wherein the zone-based distance and direction target areas further include zone-based distance and direction fairway target areas, such fairway target areas being a subsection that is a smaller area than the entire fairway.

19. The system of claim 18, further including out-of-target areas that are not within the target areas.

20. The system of claim 18, wherein the statistical analysis further includes actual shot locations as a percentage for the out-of-target areas and for inside the zone-based distance and direction target areas.

21. The system of claim 20, wherein the out-of-target areas include indication of a long of target area, a short of target area, a right of target area, and a left of target area.

22. The system of claim 8, wherein the GPS data includes for at least one golf shot GPS data relating to at least a starting point, a target area and an end point where the golf ball came to rest after the golf shot.

* * * * *